US011040509B2

(12) United States Patent
Conti

(10) Patent No.: US 11,040,509 B2
(45) Date of Patent: Jun. 22, 2021

(54) PROCESS AND APPARATUS FOR BUILDING TYRES FOR VEHICLE WHEELS

(71) Applicant: PIRELLI TYRE S.P.A., Milan (IT)

(72) Inventor: Davide Conti, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 852 days.

(21) Appl. No.: 15/534,850

(22) PCT Filed: Dec. 14, 2015

(86) PCT No.: PCT/IB2015/059586
§ 371 (c)(1),
(2) Date: Jun. 9, 2017

(87) PCT Pub. No.: WO2016/097970
PCT Pub. Date: Jun. 23, 2016

(65) Prior Publication Data
US 2017/0334159 A1    Nov. 23, 2017

(30) Foreign Application Priority Data

Dec. 17, 2014   (IT) .......................... MI2014A002162

(51) Int. Cl.
*B29D 30/46* (2006.01)
*B26D 1/04* (2006.01)
(Continued)

(52) U.S. Cl.
CPC ............. *B29D 30/46* (2013.01); *B26D 1/045* (2013.01); *B26D 3/003* (2013.01); *B29D 30/08* (2013.01);
(Continued)

(58) Field of Classification Search
CPC ............. B29D 30/46; B29D 2030/463; B29D 2030/466; B26D 2001/0033;
(Continued)

(56) References Cited

U.S. PATENT DOCUMENTS 2,873,802 A * 2/1959 Frohlich ................. B29D 30/46
                                                            83/176
3,641,855 A * 2/1972 Balle ...................... B29D 30/46
                                                            83/171
(Continued)

FOREIGN PATENT DOCUMENTS

EP    1799408 A1    6/2007
EP    2132028 A2    12/2009
(Continued)

OTHER PUBLICATIONS

Office Action and Written Opinion from the Brazilian Patent Office in counterpart Brazilian Application No. BR112017012907.8 dated Feb. 21, 2020.
(Continued)

*Primary Examiner* — Geoffrey L Knable
(74) *Attorney, Agent, or Firm* — Finnegan, Henderson, Farabow, Garrett & Dunner, L.L.P.

(57) ABSTRACT

A process and an apparatus for cutting a continuous rubber-covered belt in a process for building tyres for vehicle wheels, wherein the apparatus includes a cutting group, in turn comprising: a knife formed by a first half-part and a second half-part and movable along a cutting direction that is tilted with respect to a supply direction of a rubber-covered belt placed beneath the knife. The process includes: lifting a lifting element placed below the continuous rubber-covered belt and at the cutting zone, until a portion of rubber-covered belt is lifted, and lowering the single first-half part of the knife, making it slide with respect to the second half-part.

15 Claims, 12 Drawing Sheets

(51) Int. Cl.
  *B26D 3/00* (2006.01)
  *B29D 30/08* (2006.01)
  *B26D 1/00* (2006.01)
(52) U.S. Cl.
  CPC .................. *B26D 2001/006* (2013.01); *B26D 2001/0033* (2013.01); *B65H 2301/515326* (2013.01)
(58) Field of Classification Search
  CPC .. B26D 2001/006; B26D 1/045; B26D 1/115; B26D 1/11; B26D 3/003; B26D 7/015; B65H 35/0086; B65H 2301/515326
  See application file for complete search history.

(56) References Cited

U.S. PATENT DOCUMENTS

| | | | |
|---|---|---|---|
| 3,732,767 A | 5/1973 | Habert | |
| 2007/0256531 A1 | 11/2007 | Gonzalez et al. | |
| 2010/0077894 A1* | 4/2010 | Kaagman | B26D 1/045 83/171 |

FOREIGN PATENT DOCUMENTS

| | | |
|---|---|---|
| JP | 58-59830 | 4/1983 |
| JP | 58-059830 A * | 4/1983 |
| JP | 60-139440 | 7/1985 |
| JP | 4-289094 | 10/1992 |
| JP | 2006-75951 | 3/2006 |
| JP | 2007-313791 | 12/2007 |
| WO | WO 00/23261 | 4/2000 |
| WO | WO 035379 | 5/2003 |
| WO | WO 2006/037723 | 4/2006 |
| WO | WO 2006/037723 A1 | 4/2006 |
| WO | WO 2008/105655 | 9/2008 |
| WO | WO 2008/105655 A2 | 9/2008 |
| WO | WO 2012/172462 | 12/2012 |

OTHER PUBLICATIONS

Notification of the Fourth Office Action dated Apr. 13, 2020, from China National Intellectual Property Administration, in counterpart Chinese Application No. 201580067819.2.

International Search Report from the European Patent Office for International Application No. PCT/IB2015/059586, dated Mar. 29, 2016.

Written Opinion of the International Searching Authority from the European Patent Office for International Application No. PCT/IB2015/059586, dated Mar. 29, 2016.

* cited by examiner

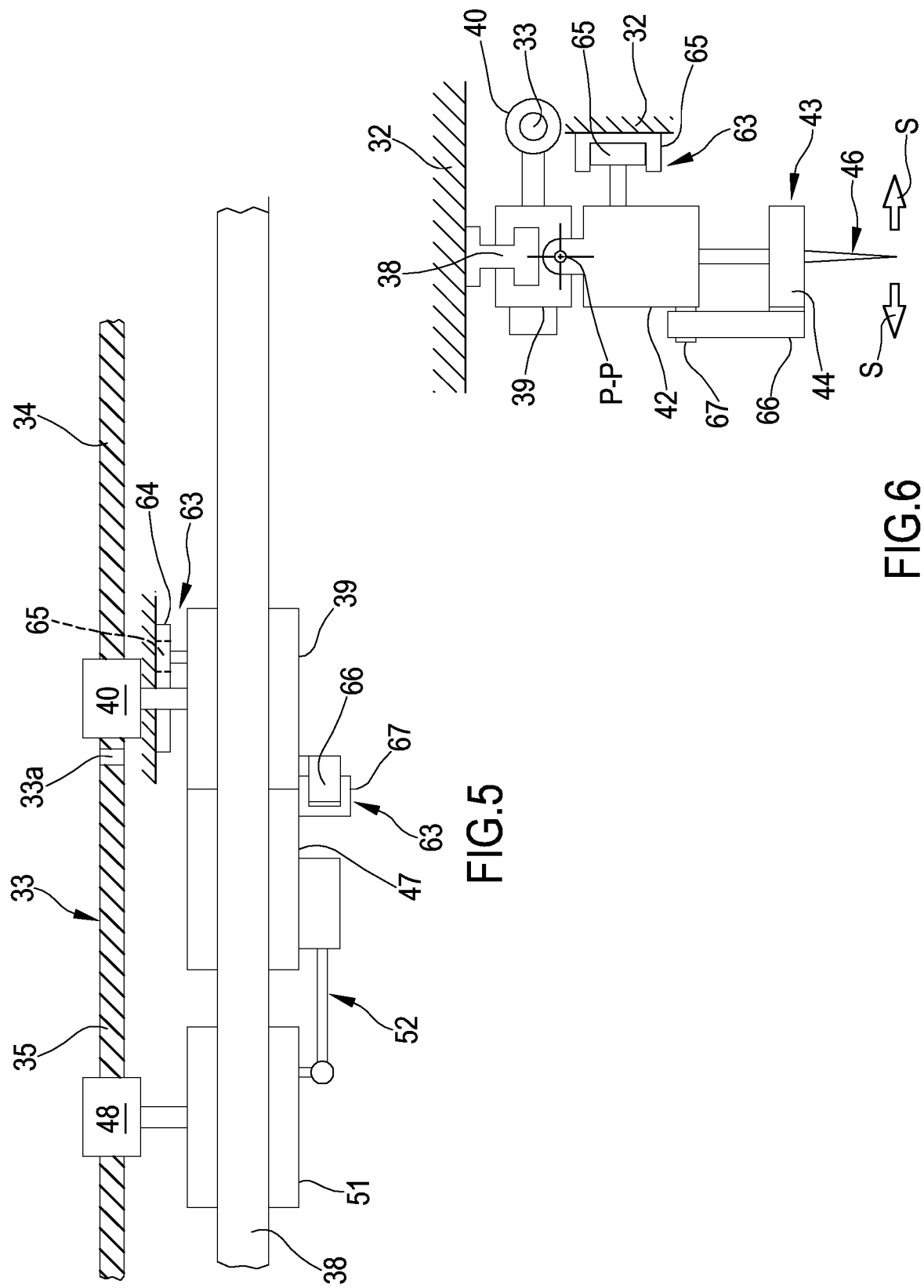

PROCESS AND APPARATUS FOR BUILDING TYRES FOR VEHICLE WHEELS

CROSS REFERENCE TO RELATED APPLICATIONS

This application is a national phase application based on PCT/IB2015/059586, filed Dec. 14, 2015, and claims the priority of Italian Patent Application No. MI2014A002162, filed Dec. 17, 2014, the content of both applications being incorporated herein by reference.

BACKGROUND OF THE INVENTION

Field of the Invention

The object of the present invention is a process and an apparatus for building tyres for vehicle wheels.

In particular, in the scope of said process and apparatus, the present invention is relative to the cutting of a rubber-covered belt intended for building a tyre for vehicle wheels.

Description of the Related Art

A tyre for vehicle wheels generally comprises a carcass structure comprising at least one carcass ply having end flaps engaged with respective anchoring annular structures, each normally formed by at least one substantially circumferential annular insert on which at least one filler insert, radially tapered moving away from the rotation axis, is applied. In radially outer position with respect to the carcass structure, a belt structure is associated comprising one or more belt layers, situated in radial superimposition with respect to each other and with respect to the carcass ply, having textile or metallic reinforcement cords with cross orientation and/or substantially parallel to the circumferential extension direction of the tyre. In radially external position with respect to the belt structure, a tread band is applied, it too made of elastomeric material like other semifinished products constituting the tyre. Between the tread band and the belt structure, a so-called "underlayer" made of elastomeric material can be interposed, with properties suitable for ensuring a stable joining of the belt structure with the tread band itself. Respective sidewalls made of elastomeric material are also applied on the lateral surfaces of the carcass structure, each extended from one of the lateral edges of the tread band up to the respective anchoring annular structure to the beads. In the tyres of "tubeless" type, the carcass ply is internally covered by a layer of elastomeric material, preferably with butyl base, normally termed "liner" and having optimal characteristics of impermeability to air and extended from one bead to another.

With the term "elastomeric material" it is intended to indicate a composition comprising at least one elastomeric polymer and at least one reinforcement filler. Preferably, such composition also comprises additives such as, for example, a cross-linking agent and/or a plasticising agent. Due to the presence of the cross-linking agent, by means of heating such material can be cross-linked, thus forming the final manufactured product.

With the term "rubber-covered belt" it is intended a belt-like element formed by a plurality of textile or metallic reinforcement cords, substantially parallel to each other, covered or immersed in an elastomeric material and tilted a non-zero angle with respect to a longitudinal extension direction of the rubber-covered belt itself.

With the term middle line of the rubber-covered belt it is intended the set of points equidistant from opposite longitudinal and lateral edges of the rubber-covered belt. With the term middle line of the conveyor it is intended the set of points equidistant from opposite longitudinal and lateral edges of the conveyor.

With the term lying plane of the knife it is intended the plane containing the cutting edges or blades of the knife.

With the term plane of symmetry of the knife it is intended the plane of symmetry orthogonal to the lying plane.

With the term central axis of the knife it is intended the intersection of the knife symmetry plane and lying plane.

With the term cutting direction it is intended the direction for moving the knife and its half-parts parallel to the abutment surface and lying in the lying plane of the knife. With the term lowering/lifting direction it is intended the direction for moving the knife and its half-parts perpendicular to the abutment surface and to the cutting direction. With the term supply direction it is intended the advancing direction of the rubber-covered belt parallel to its longitudinal extension.

With the term lateral oscillating direction it is intended the direction perpendicular to the lying plane of the knife and to the cutting direction.

With the term centre of the rubber-covered belt/conveyor it is intended the intersection between the cutting direction and the middle line.

The document WO 00/23261 illustrates a method and an apparatus for cutting segments from a long sheet of elastomeric material. An initial opening is formed in the sheet by means of a penetration/separation element (punch). Two ultrasonic knives are then inserted on both sides of the penetration/separation element and positioned for cutting the sheet with a small tilt angle with respect to the plane of the sheet to be cut. The knives are then moved towards opposite edges of the sheet itself.

The document WO 03/035379, on behalf of the same Applicant, illustrates a method and an apparatus for cutting a semifinished product, constituted by a rubber-covered belt, used for building a green tyre. The method comprises the steps of: forming a notch of predefined length and extended between two adjacent cords along a cutting direction by means of a punch cooperating with a counter-blade; inserting at least one cutting blade through the notch; executing a first and a second cut of the strip by moving the blade along the cutting direction for a first portion extended between the notch and a first lateral edge of the strip and for a second portion extended between the notch and a second lateral edge of the strip.

The document WO 2012/172462, on behalf of the same Applicant, illustrates a cutting device arranged for cutting to size a rubber-covered belt provided with a plurality of parallel reinforced cords. The cutting device comprises a conveyor and a rectilinear guide carrying a knife with hot blade, arranged above the conveyor. The rubber-covered belt is lifted below the guides to form a bump. The knife is moved along a cutting direction in a first sense until the tip of one of the cutters of the knife cuts the rubber-covered belt at the bump. The tip penetrates into the rubber-covered belt and partially lifts it, continuing to cut it from the middle line until it reaches a first lateral edge of the belt itself. Subsequently, the knife is moved along the cutting direction, in a second sense opposite the first, in a manner such that the tip of the cutter opposite that used in the preceding step engages the rubber-covered belt still in proximity to the bump. The tip then partially lifts the rubber-covered belt and continues to cut it from the middle line until it reaches a second lateral edge thereof. In such context, the Applicant has perceived the need to improve the quality of the pieces of predefined length obtained from the cutting of the rubber-covered belt, with particular reference to the finishing of the cut edges, in a manner so as to improve the overall quality of the tyres built with such pieces.

SUMMARY OF THE INVENTION

In particular, the Applicant has observed that the systems of the type described in the documents WO 03/035379 and WO 2012/172462, using a single blade that operates by being moved first in one direction and then in the opposite one, make an asymmetrical cut on the semifinished product (rubber-covered belt) that generates stresses which tend to deform and/or move the belt in a non-repeatable, hard-to-manage manner. The asymmetrical movement for example compromises the correct head/tail alignment of the ends of the belt once laid on the forming drum. Such asymmetry is above all evident in the second section of the cut, when the knife returns into the material (at the centre or at an edge) after having exited therefrom and pushes the belt, deforming it, before starting to execute the actual cutting.

The Applicant has also observed that the systems of the type of that described in WO 00/23261, in which provision is made for executing a first notch with a central punch, in order to then allow the insertion of a double blade, often lead to damage of the reinforcement cords since the punch can penetrate into a cord that it encounters during notch execution, causing the breakage of such cord.

In such context, the Applicant has observed the need to prevent damaging the cords during all the steps of the cutting, in a manner so as to improve the quality of the cutting of the semifinished product and of the tyre being built.

In particular, the Applicant has perceived that, by controlling the geometry of the element set for cutting as well as the trajectory completed by the same during the approach to the rubber-covered belt up to impact with the latter, it is possible to prevent the damage of the cords present inside the rubber-covered belt.

The Applicant has also perceived the need to minimise the deformations to which the belt is subject during all the cutting steps.

The Applicant has perceived that, by rendering such deformations as symmetric as possible with respect to a middle line of the belt itself, the deformations of the ends of the material thus cut are minimised.

The Applicant has therefore perceived that, by controlling in each step of the cutting process the trajectory of the suitably-shaped element set for cutting, it is possible to improve the quality of the rubber-covered belt, cut to size, and of the tyre built using the same.

The Applicant has thus found that, by employing a knife formed by two symmetric half-parts, suitably managed so as to first move only one of the half-parts so that it penetrates into the material and is laterally moved along a cutting direction in order to leave space for the second half-part, which can thus enter into the opening generated by the first half-part, and by subsequently moving apart the two half-parts with a symmetric and synchronised movement, it is possible to obtain a complete cutting of the rubber-covered belt, which results clean, precise and repeatable.

More specifically, according to one aspect, the present invention relates to a process for building tyres for vehicle wheels.

Preferably provision is made for forming at least one component of the tyre on a forming drum, wherein said component is formed by means of: supplying a continuous rubber-covered belt; cutting to size said continuous rubber-covered belt; laying the continuous rubber-covered belt, cut to size, on the forming drum. Preferably, cutting to size comprises: carrying a knife formed by a first half-part and by a second half-part above the continuous rubber-covered belt, in proximity to a central portion of the cutting zone.

Preferably, provision is made for lifting a lifting element placed below the continuous rubber-covered belt and at the cutting zone, until a portion of rubber-covered belt is lifted.

Preferably, provision is made for lowering the single first half-part of the knife, making it slide with respect to the second half-part until it obtains an opening in said rubber-covered belt and inserting the first half-part in the aforesaid opening. Preferably, provision is made for jointly moving the first half-part and the second half-part along a cutting direction and in a cutting sense in order to generate a notch in the rubber-covered belt by means of said first half-part.

Preferably, provision is made for lowering the second half-part, making it slide with respect to the first half-part until said second half-part is inserted in said notch. Preferably, provision is made for symmetrically moving said first and second half-part synchronously away from each other, in opposite senses and along said cutting direction.

In accordance with a different aspect, the present invention relates to an apparatus for cutting a continuous rubber-covered belt in a process for building tyres for vehicle wheels.

Preferably the apparatus for cutting a rubber-covered belt comprises a conveyor defining an abutment surface for a continuous rubber-covered belt extended along a supply direction.

Preferably provision is made for a lifting element extended along a direction transverse to the supply direction and vertically movable between a position that is lowered and a position that is lifted with respect to the abutment surface.

Preferably the apparatus for cutting a rubber-covered belt comprises a cutting group.

Preferably, the cutting group comprises a knife movable along a cutting direction that is tilted with respect to the supply direction.

Preferably, the knife comprises a first half-part and a second half-part.

Preferably, the cutting group comprises devices for moving the knife configured for moving the knife between at least the following configurations:

A. wherein the first and the second half-part are side-by-side and mutually joined on a plane of symmetry of the knife orthogonal to the cutting direction and lie in a lifted position with respect to the conveyor and substantially centred with respect to said conveyor;

B. wherein the first half-part is lowered towards the conveyor while the second half-part remains lifted;

C. wherein the first half-part and the second half-part are side-by-side and mutually joined on said symmetry plane and lie in a lowered position towards the conveyor and centred with respect to the centre of the conveyor;

D. wherein the first half-part and the second half-part are spaced from each other along said cutting direction and lie in the lowered position and at opposite edges of the conveyor.

The Applicant deems that the movements A and B, first for lowering the first half-part and subsequently for the joint translation of the two half-parts, generate an opening in the rubber-covered belt slightly longer than the lower cutter of the first half-part and carry the second half-part, still in lifted rest position, into vertical alignment with the opening originally created by the first half-part. Such combination of the movements allows preventing the damage of the cords by the knife, and allows limiting the cutting time. In addition, the second half-part can penetrate without generating any deformation in the material of the rubber-covered belt.

The Applicant also deems that the subsequent symmetric movement with synchronised opening of the two half-parts considerably limits the deformations and above all maintains such limited deformations symmetric The Applicant deems that in this manner, it is possible to automate the cutting with a device that is structurally simple, reliable, easy to maintain and inexpensive.

The Applicant deems that in this manner, it is possible to make the operation quick (in addition to being a quality operation) so as to speed up the entire building cycle. The present invention, in at least one of the aforesaid aspects, can have one or more of the preferred characteristics which are described hereinbelow.

Preferably, the continuous rubber-covered belt is fed on a conveyor along a supply direction coinciding with a longitudinal extension direction of said rubber-covered belt, until it surpasses, by a predefined length, a cutting zone of said conveyor. Preferably, the rubber-covered belt comprises a plurality of parallel reinforcement cords, immersed in a matrix of elastomeric material and tilted a predefined angle with respect to the longitudinal extension direction.

Preferably, the movement devices are configured for moving the knife in the further configuration: E, wherein the first half-part and the second half-part are spaced from each other along said cutting direction and lie in the lifted position and at the opposite edges of the conveyor.

In a first embodiment, provision is made for lowering first the single first half-part and subsequently jointly moving the first half-part and the second half-part. Preferably, the first half-part is lowered along a rectilinear and vertical lowering direction. Preferably, the first half-part is lowered in an offset position with respect to the centre of the rubber-covered belt. Preferably, the joint movement of the first half-part and second half-part is executed along a rectilinear and horizontal direction. In other words, the cutting direction is rectilinear and horizontal. Such linear and consequential movements are effective and can also be obtained with a relatively simple mechanical structure, hence one that is also reliable and inexpensive.

Preferably, at the end of the lowering and joint movement, the central axis of the knife which lies between the first half-part and the second half-part intersects the middle line of the rubber-covered belt. Preferably, when the second half-part is lowered, the central axis of the knife is substantially placed at the centre of the rubber-covered belt. In other words, after the second half-part has been lowered, the knife formed by the two joined half-parts is once again complete and is situated exactly at the centre of the rubber-covered belt, ready to be symmetrically opened and to cut said rubber-covered belt with a symmetric movement.

Preferably, cutting also comprises: forming, with the rubber-covered belt, a bump placed at the cutting zone. Preferably, the first half-part cuts the rubber-covered belt on a tilted portion of said bump. Preferably, the tilted portion forms, with a horizontal plane a tilt angle comprised between about 20° and about 45°, preferably equal to about 40°.

The first half-part comes into contact with the tilted portion of the bump with an entrance angle (delimited between the direction of said first half-part and the surface of the tilted portion) equal to: incidence angle+tilt angle. Preferably, the entrance angle is comprised between about 65° and about 125°, more preferably equal to about 110°. Preferably, the incidence angle is equal to 90°, so that the entrance angle is equal to: 90°+tilt angle.

Preferably, the first half-part comprises a sabre-like half-cutting edge and cuts the rubber-covered belt at a tip of said sabre-like half-cutting edge. Preferably, the first half-part penetrates into the rubber-covered belt at said tip and at a lower curved portion of the sabre-like half-cutting edge adjacent to the tip. The tip of the sabre cuts the material which is tilted and pliable while the lower curved portion of the sabre, which is elongated and curved, provides directionality. Such shape of the sabre-like half-cutting edge allows preventing the cutting of the cords and allows the half-part to stably proceed between two adjacent cords while it penetrates into the rubber-covered belt.

Preferably, the first half-part and the second half-part each comprise a respective lateral cutting edge and wherein, during the symmetrical moving away of said first and second half-part, the rubber-covered belt is cut by said lateral cutting edges. Preferably, the first half-part and the second half-part each comprise a support edge and wherein, during the symmetrical moving away of said first and second half-part, the rubber-covered belt rests on and is supported by said support edges.

Preferably, during the symmetrical moving away, the first half-part and the second half-part are free to independently oscillate along a lateral oscillating direction perpendicular to the cutting direction. The oscillation allows the half-parts of the knife to support an angle variation with respect to its nominal value while the two half-parts are opened, hence to prevent damage to the rubber-covered belt.

Preferably, during the lowering, the first half-part and the second half-part are locked to each other and with respect to the rubber-covered belt along a lateral oscillation direction. In other words, during the lowering of the first half-part and the second half-part and the entrance of the material of the rubber-covered belt, oscillation is prevented in order to ensure the centring of the notch.

Preferably, after the cutting to size, provision is made for lifting said first and second half-part and, preferably, for moving said first and second half-part close to each other along the cutting direction until the first half-part is rejoined to the second half-part and once again carrying the knife above the central portion of the cutting zone. Preferably, after the rejoining, the first half-part pushes the second half-part and said half-parts jointly translate until an offset position is reached with respect to the centre of the rubber-covered belt. Preferably, the first half-part is rejoined to the second half-part at the centre of the rubber-covered belt. The knife is then ready to execute a new cutting cycle.

Preferably, in configuration A, a plane of symmetry of the knife lies shifted with respect to a centre of the conveyor.

Preferably, the movement devices are configured for independently moving each of the half-parts of the knife between the lifted position and the lowered position. This characteristic allows cutting the rubber-covered belt by using only one half-part. Preferably, the movement devices are configured for moving said half-parts symmetrically and synchronously away from each other along the cutting direction. This characteristic allows obtaining symmetric and synchronised cutting.

Preferably, the movement devices are configured for moving said half-parts symmetrically and closer to each other along the cutting direction. This characteristic allows quickly bringing the knife back to the centre in order to begin a new cutting cycle.

Preferably, the movement devices are configured for moving said half-parts jointly as a single knife along the cutting direction. This characteristic allows easily managing the two half-parts as a single body until it is necessary to separate them. Preferably, the first half-part and the second half-part are hung and oscillating around an oscillating axis parallel to the cutting direction.

Preferably, the movement devices comprise devices for blocking the oscillation that are operatively active when the first and the second half-part lie in the substantially centred position with respect to the conveyor.

Preferably, each said first half-part and second half-part has a sabre-like half-cutting edge and, when the first half-part and the second half-part are side-by-side and mutually joined on the symmetry plane, the assembly of the sabre-like semi-cutting edges defines a single, substantially continuous lower cutting edge. Such continuous lower cutting edge has a substantially semi-lunar shape. Preferably, each sabre-like half-cutting edge comprises a tip and a lower curved portion, in which said tips are oriented on opposite sides of the knife. Preferably, said tip has a radius of curvature comprised between about 1 mm and about 5 mm. Preferably, said lower curved portion has a radius of curvature comprised between about 20 mm and about 100 mm. The sabre-like half-cutting edge has the function of cutting the rubber-covered belt and generating the first notch.

Preferably, each said first half-part and second half-part has a respective lateral cutting edge placed above the respective sabre-like half-cutting edge and directed in the cutting direction on opposite sides of the knife. Preferably, said lateral cutting edge has a radius of curvature between about 1 mm and about 3 mm. The lateral cutting edges have the function of executing the symmetrical cutting starting from the centre of the rubber-covered belt.

Preferably, the first half-part and the second half-part each comprise a support edge directed upward and positioned between the tip and the lateral cutting edge. The support edges lift and support the rubber-covered belt during the symmetric cutting. Preferably, the cutting group comprises a support frame placed above the conveyor and carrying the movement devices, the first half-part and the second half-part. Preferably, the movement devices comprise: a shaft rotatably mounted on the support frame and extended along the cutting direction, said shaft having a first worm screw and a second worm screw that are jointly rotatable; a motor operatively connected to the shaft; a first screw nut mounted on the first worm screw and operatively connected to the first half-part and a second screw nut mounted on the second worm screw and operatively connected to the second half-part. The first worm screw has a sense of its thread opposite the sense of the thread of the second worm screw. Such structure is mechanically simple and reliable and allows obtaining the requested symmetrical movements.

Preferably, the movement devices comprise: a first actuator interposed between the first screw nut and the first half-part and movable along a lowering/lifting direction and a second actuator interposed between the second screw nut and the second half-part and movable along said lowering/lifting direction. Such structure is mechanically simple and reliable and allows vertically and independently moving the half-parts.

Preferably, the movement devices comprise an elastic device acting along a direction parallel to the cutting direction and interposed between the second screw nut and the second half-part, wherein said elastic device is configured for pushing the second screw nut away from the second half-part along said cutting direction. Preferably, the elastic device is a pneumatic spring, more preferably a pneumatic cylinder. Such structure allows obtaining the joint and asymmetric movement of the first and of the second half-part by exploiting the rotation of the shaft that carries the worm screws.

Preferably, the movement devices comprise: a rail constrained to the support frame and extended parallel to the shaft; a first trolley slidably associated with the rail and carrying the first actuator and the first half-part, wherein the first trolley is rigidly constrained to the first screw nut; a second trolley slidably associated with the rail and carrying the second actuator and the second half-part.

Preferably, the movement devices comprise: an auxiliary trolley slidably associated with the rail and connected to the second trolley by means of the interposition of the elastic device. Preferably, the pneumatic cylinder comprises a main body and a stem that is movable with respect to the main body. Preferably, the main body is constrained to the second trolley or to the auxiliary trolley and the stem is constrained to the auxiliary trolley or to the second trolley.

Preferably, the first actuator is connected below the first trolley and carries the first half-part associated therewith, and wherein the second actuator is connected below the second trolley and carries the second half-part associated therewith. Below the abovementioned half-parts, there are therefore no structures/mechanisms that could obstruct the movements thereof and the cutting of the rubber-covered belt. Preferably, the first actuator is hinged to the first trolley around a respective oscillating axis parallel to the cutting direction and the second actuator is hinged to the second trolley around a respective oscillating axis parallel to the cutting direction. The abovementioned oscillating axes coincide with each other. The first and the second actuator with the respective half-parts are therefore free to independently oscillate.

Preferably, the first actuator and/or the second actuator carry/carries an anti-oscillation wheel engageable in a guide integral with the support frame, arranged at a central zone of the shaft and extended parallel to said shaft, in order to prevent the oscillation and for centring the half-parts when they are situated at said central zone of the shaft. The wheel enters into the guide when the first actuator and/or the second actuator have approached said central zone. When the wheel is not engaged in the guide, the first and the second actuator with the respective half-parts are free to oscillate.

Preferably, the first actuator (or the second actuator) comprises a projection insertable in a seat of the second actuator (or of the first actuator) when the first and the second half-part are side-by-side and mutually joined. By means of this expedient, only the first (or only the second) actuator can be provided with the abovementioned anti-oscillation wheel while the second (first) actuator is constrained to the first (second) by means of the projection/seat coupling and in any case cannot oscillate.

Preferably, each said first actuator and second actuator comprises:
a main body connected to the respective first or second trolley;
a part that is movable with respect to the main body, carrying the respective first half-part or second half-part.

Preferably, the projection and the seat are carried by the respective movable parts of the first and second actuator.

Preferably, said projection is free to vertically slide in said seat. The relative vertical movement between the first half-part and the second half-part is not obstructed. Preferably, the movable part of each said first and second actuator comprises a pair of stems and a plate carrying the respective half-part of the knife.

Preferably, the lifting element has a passage for the knife when said lifting element is in the lifted position.

Preferably, the lifting element comprises two rollers arranged aligned along the same axis and axially spaced in order to delimit said slit.

Preferably, such cut rubber-covered belt is used for making belt strips in a tyre for vehicle wheels.

BRIEF DESCRIPTION OF THE DRAWINGS

Further characteristics and advantages will be clearer from the detailed description of a preferred but not exclusive embodiment of a process and an apparatus for building tyres for vehicle wheels according to the present invention.

Such description will be set forth hereinbelow with reference to the enclosed drawings, provided only as a non-limiting example, in which:

FIG. 5 is a top view of the cutting group of FIG. 4;

FIG. 6 is a view of the cutting group along the arrow VI of FIG. 4;

DETAILED DESCRIPTION OF THE INVENTION

Figure 1:
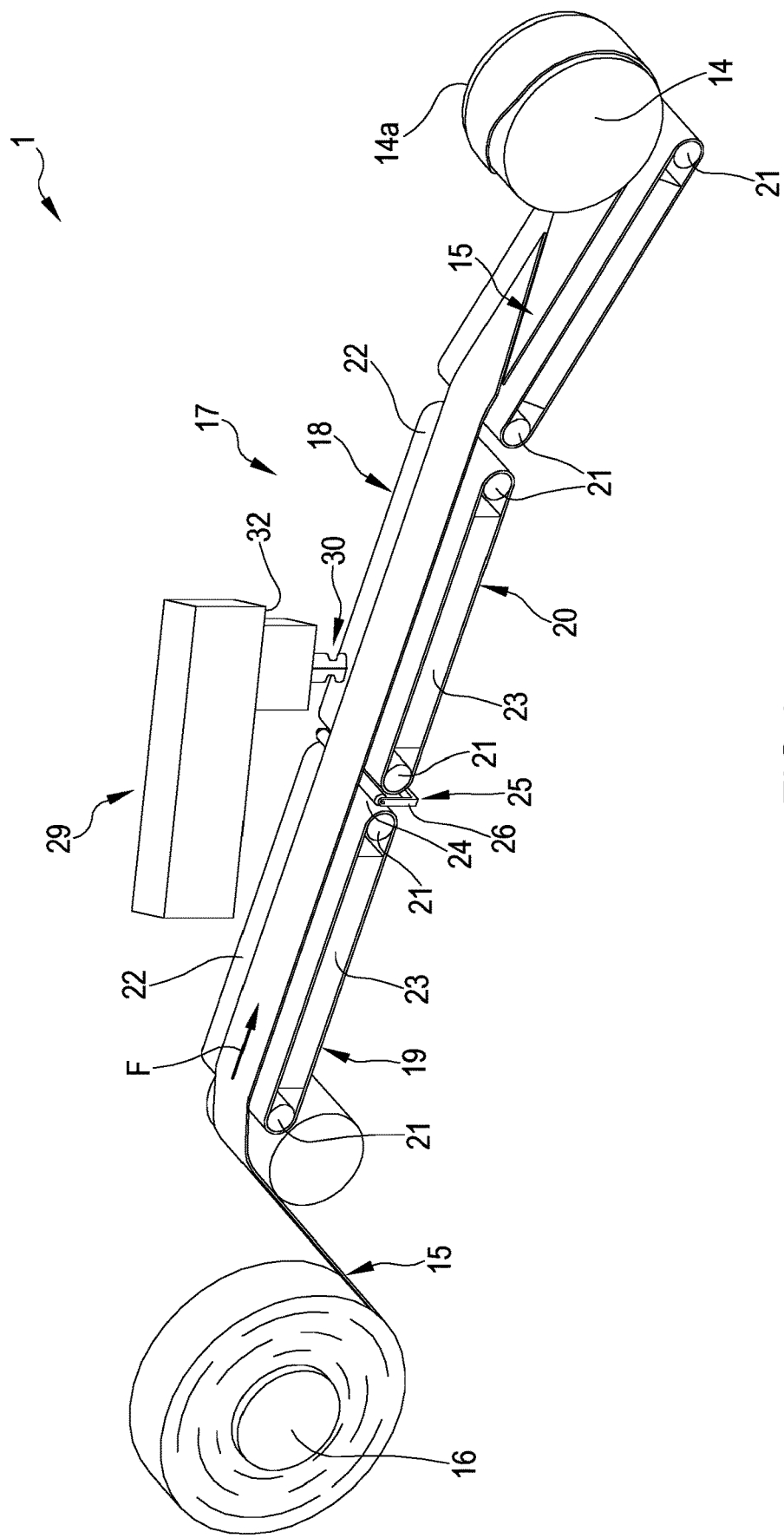
FIG. 1 shows a perspective view of an apparatus for cutting a continuous rubber-covered belt in a process for building tyres for vehicle wheels according to the present invention.

With reference to FIG. 1, reference number 1 overall indicates an apparatus for cutting a continuous rubber-covered belt in a process for building tyres for vehicle wheels in accordance with the present invention.

Figure 19:
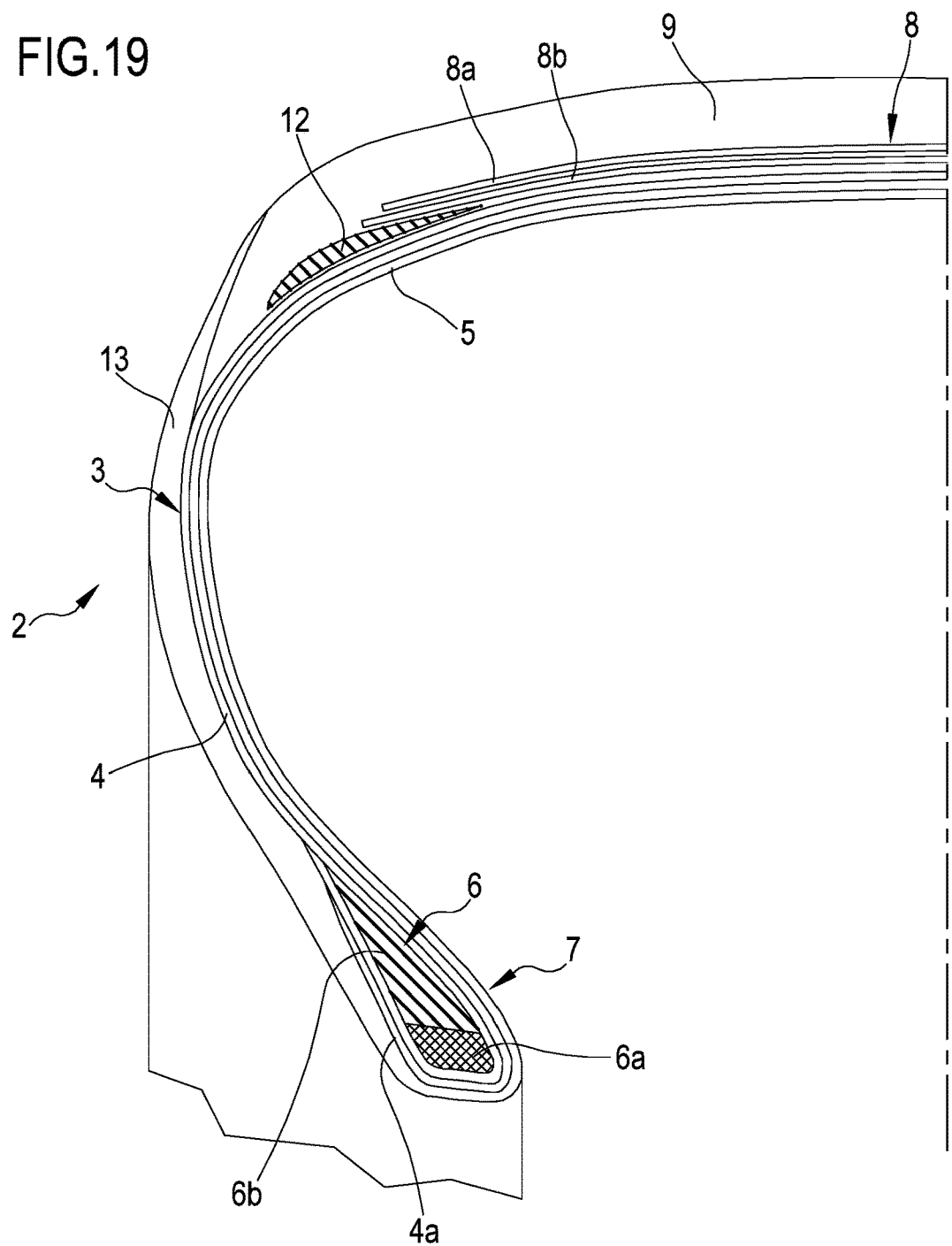
FIG. 19 shows a radial half-section of a tyre built with the apparatus according to the present invention.

A tyre 2 obtained in a plant comprising said apparatus and according to the process in accordance with the present invention is illustrated in FIG. 19 and essentially comprises a carcass structure 3 having at least one carcass ply 4. A layer of impermeable elastomeric material or so-called liner 5 can be applied inside the carcass ply/plies 4. Two anchoring annular structures 6, each comprising a so-called bead core 6a carrying an elastomeric filler 6b in radially external position, are engaged with respective end flaps 4a of the carcass ply/plies 4. The anchoring annular structures 6 are integrated in proximity to zones normally identified with the name "beads" 7, at which the engagement between the tyre 2 and a respective mounting rim usually occurs. A belt structure 8 comprising multiple belt layers 8a, 8b is circumferentially applied around the carcass ply/plies 4, and a tread band 9 is circumferentially superimposed on the belt structure 8.

Figure 20:
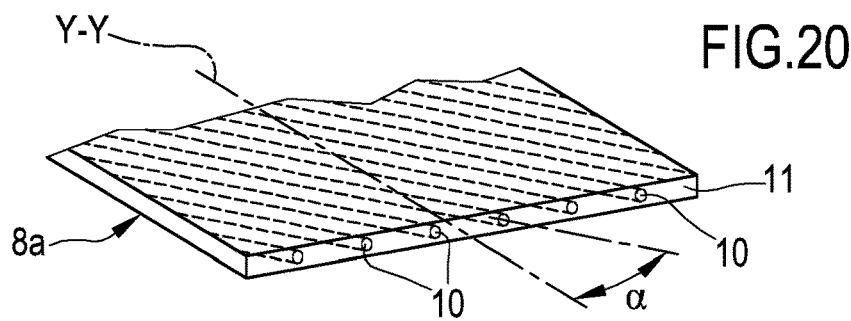
FIG. 20 illustrates a perspective view of a rubber-covered belt.

As is illustrated in FIG. 20, each belt layer 8a, 8b comprises a plurality of textile or metallic reinforcement cords 10, parallel to each other, immersed in a matrix of elastomeric material 11 and tilted a predefined angle "α" with respect to the circumferential extension direction "Y-Y" of the tyre 2. The reinforcement cords 10 of two adjacent belt layers 8a, 8b are preferably crossed.

The belt structure 8 can be associated with so-called "under-belt inserts" 12 each situated between the carcass ply/plies 4 and one of the axially opposite end edges of the belt structure 8. Two sidewalls 13, each extended from the corresponding bead 7 to a corresponding lateral edge of the tread band 9, are applied in laterally opposite positions on the carcass ply/plies 4.

The abovementioned components of the tyre 1 are made on one or more building drums by moving said building drums between different work stations; at each of such stations, suitable devices apply the different abovementioned (semifinished) elements on the building drums.

In a preferred embodiment, the tyre production plant (not shown in its entirety) comprises a carcass building line, at which one or more building drums are sequentially moved between different work stations arranged to form, on each building drum, a carcass sleeve comprising the carcass ply/plies 4, the liner 5, the anchoring annular structures 6 and possibly at least one part of the sidewalls 13. Simultaneously, in an outer sleeve building line, one or more forming drums 14 are sequentially moved between different work stations arranged to form, on each forming drum 14, an outer sleeve comprising at least the belt structure 8, the tread band 9, and possibly at least one part of the sidewalls 13.

The plant also comprises an assembly station at which the outer sleeve is removed from the auxiliary drum in order to be coupled to the carcass sleeve.

The built tyres 2 are sequentially transferred to at least one vulcanisation unit, not shown.

The apparatus 1 illustrated in FIG. 1 is arranged for cutting to size a rubber-covered belt 15 in order to obtain a piece, and for winding of such piece on a radially outer surface 14a of a forming drum 14 for the formation of one of the abovementioned belt layers 8a, 8b.

Figure 2:
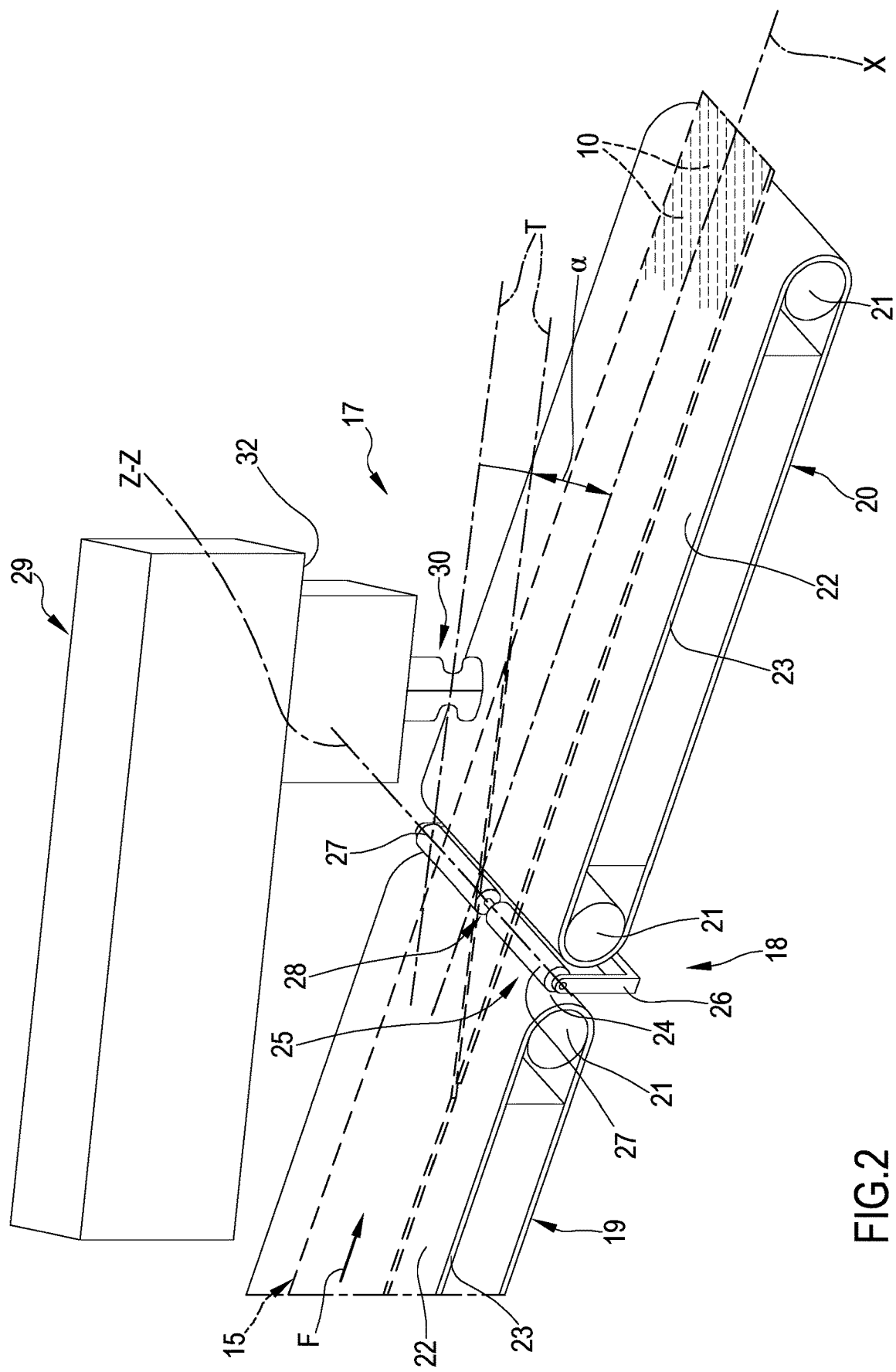
FIG. 2 illustrates an enlarged portion of the apparatus of FIG. 1.

The rubber-covered belt 15 therefore comprises a plurality of the abovementioned parallel reinforcement cords 10, immersed in the matrix of elastomeric material 11 and tilted the predefined angle "a" with respect to the longitudinal extension direction "X" of the rubber-covered belt 15 itself, which in the finished tyre corresponds with the abovementioned direction "Y-Y" (FIGS. 2 and 20).

The apparatus 1 illustrated in FIG. 1 comprises a reel holder 16, on which the rubber-covered belt 15 is wound and stored in a reel, and a cutting device 17 arranged downstream of the reel holder 16 and upstream of the forming drum 14 with respect to a supply direction "F" of the belt 15 itself (coinciding with said longitudinal extension direction "X").

The cutting device 17 comprises a conveyor 18 formed by a first part 19 and a second part 20 respectively comprising a first conveyor belt and a second conveyor belt arranged consecutively one after the other along the abovementioned supply direction "F". Each of the two conveyor belts 19, 20 is wound on pulleys 21 moved by motors, preferably "brushless", and has an upper abutment surface 22 that slides, abutted against a continuous support surface 23, in the supply direction "F". The conveyor 18 is capable of supporting and transporting wide rubber-covered belts 15, for example up to about 350 mm-400 mm.

The first and the second conveyor belt 19, 20 together delimit a slit 24 which is extended over the entire width of the conveyor 18 and at which the rubber-covered belt 15 does not rest on the upper abutment surfaces 22. The slit 24 is extended along a direction orthogonal to the supply direction "F".

Figure 3:
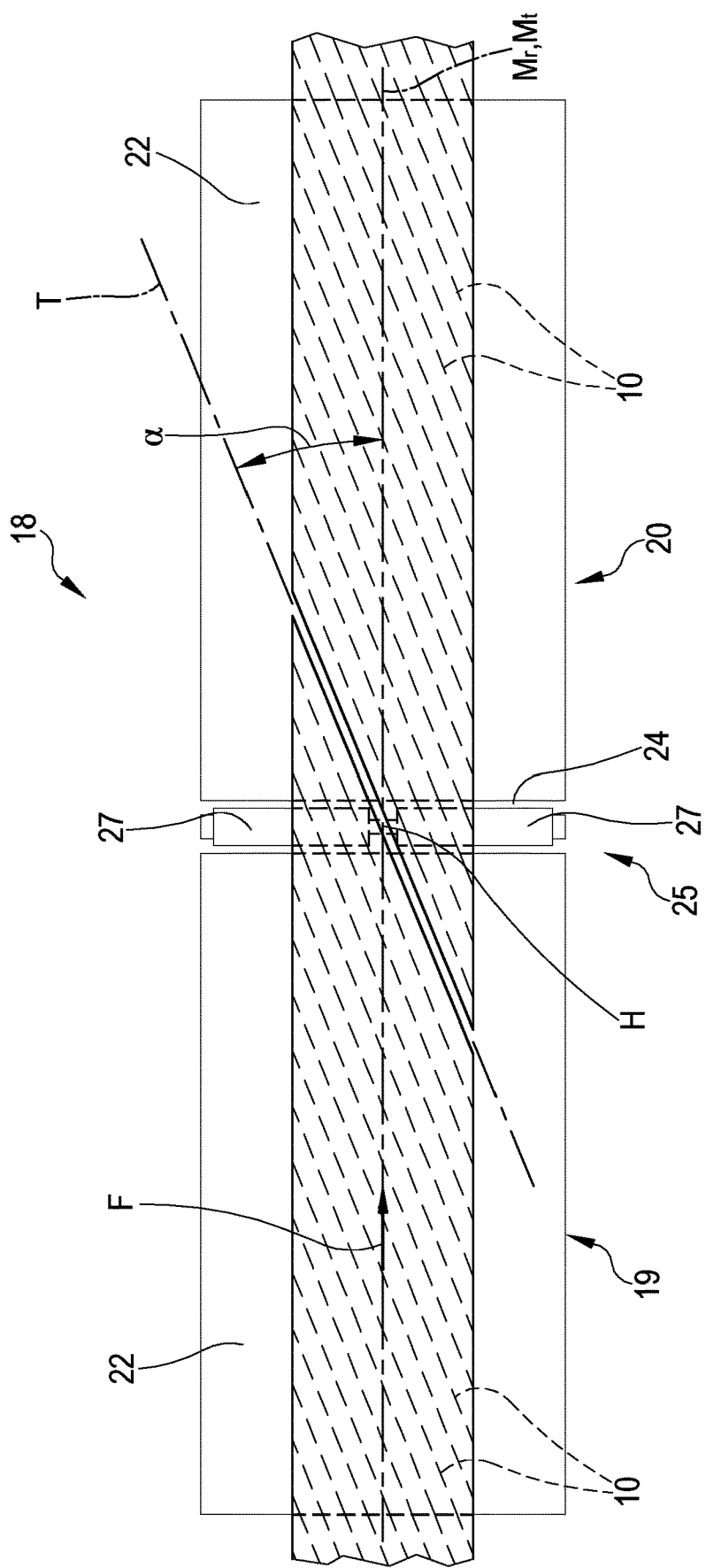
FIG. 3 is a top view of the portion of FIG. 2 with some parts removed in order to better illustrate other parts.

At such slit 24, a lifting element 25 lies which can be moved along a vertical direction between a first position and a second position. The lifting element 25 comprises a support 26 on which two rollers 27 are idly mounted, independent from each other. The two rollers 27 are aligned along the slit 24 and have a common rotation axis "Z-Z" (FIGS. 2 and 3). An actuator 27a is capable of moving the support 26 together with the two rollers 27 between the first position and the second position.

In the first position, or lowered position, the two rollers 27 are retracted within the slit 24 or, in other words, an upper terminal surface of the two rollers 27 lies beneath the imaginary abutment surface obtained by extending the upper abutment surface 22 of the conveyor belts 19, 20.

In the second position, or lifted position, the two rollers 27 emerge upward from the slit 24 or, in other words, project beyond the imaginary abutment surface obtained by extending the upper abutment surface 22 of the conveyor belts 19, 20.

The mutually facing terminal ends of the two rollers 27 delimit a passage 28 which constitutes an interruption of the radially peripheral surface of the two rollers 27 (FIGS. 2 and 3).

Above the conveyor 18 and at a cutting zone, a cutting group 29 is positioned. The cutting group 29 comprises a knife 30, preferably with heated blade, movable along a rectilinear cutting direction "T" along which the rubber-covered belt 15 must be cut. The cutting direction "T" is parallel to the abutment surface 22 and is tilted with respect to the supply direction "F" and with respect to the longitudinal extension "X" of the rubber-covered belt 15 the predefined tilt angle "α" of the reinforcement cords 10 (FIG. 3).

The tilt of the cutting group 29 can be continuously adjusted in order to change the tilt of the cutting direction "T" and cut rubber-covered belts 15 with different tilts of the cords 10. The predefined angle "α" of the cutting direction "T" can for example be adjusted between about 10° and about 50°.

The cutting direction "T" passes through a middle line "Mr" of the rubber-covered belt 15 and through a middle line "Mt" of the conveyor 18 at the abovementioned passage 28 between the rollers 27, as is clearer in FIG. 3 in plan view. The intersection between the cutting direction "T" and the middle line "Mr" of the rubber-covered belt 15 (which coincides with the middle line "Mt" of the conveyor 18) defines the centre "H" of the rubber-covered belt 15 and of the conveyor 18.

The cutting group 29 comprises (FIGS. 1, 2, 4, 5 and 6) movement devices 31 of the knife 30 constrained to a support frame 32 placed above the conveyor 18. In FIGS. 1 and 2, the support frame 32 is schematically represented as an elongated box-like casing.

The movement devices 31 comprise a shaft 33 rotatably mounted in the support frame 32 and extended along the cutting direction "T". The shaft 33 is constituted by a first worm screw 34 and by a second worm screw 35 arranged consecutively, aligned along a same common axis and jointly rotatable. The first worm screw 34 and the second worm screw 35 are mutually connected at a central joint 33a placed in a central zone of the shaft 33. The first worm screw 34 has a sense of its thread opposite the sense of the thread of the second worm screw 35. A motor 36 is mounted in the support frame 32 and is operatively connected to the shaft 33, for example by means of a belt transmission 37, in order to cause the rotation thereof. A rail 38 is mounted in the support frame 32 and is extended parallel to the shaft 33. In the schematic FIG. 4, for the sake of clarity, the shaft 33 has been depicted above the rail 38 even if in reality it lies alongside, like in FIG. 5.

A first trolley 39 is slidably coupled to the rail 38 and is hung below said rail 38. The first trolley 39 also carries a first screw nut 40 rigidly connected thereto, which in turn is mounted on the first worm screw 34.

A first actuator 41 is hung below the first trolley 39. The first actuator 41 is hinged to the first trolley 39 around a respective oscillating axis "P-P" parallel to the cutting direction "T".

In particular, the first actuator 41 is of pneumatic type and comprises a main body 42 hung from the respective first trolley 39 and pivoted around the abovementioned oscillating axis "P-P". The main body 42 carries a movable part 43 having a plate 44 and a pair of stems 45 integral with the plate 44 and slidably inserted in a lower zone of the main body 42. The movable part 43 is placed below the main body 42 and the plate 44 is hung beneath the stems 45. Inside the main body 42, the first actuator 41 comprises pneumatic movement elements (pistons, chambers, pneumatic connections, etc.), not shown. The stems 45 are oriented along a vertical lowering/lifting direction "W" perpendicular to the abutment surface 22 and to the cutting direction "T". The movable part 43 is movable between a first position, in which it lies adjacent to the main body 42 with the stems 45 retracted, and a second position, in which it lies spaced from the main body 42 with the stems 45 extracted (as in FIG. 4). The plate 44 carries beneath it a first half-part 46 of the knife 30, which is vertically extended downward starting from said plate 44.

A second trolley 47 is slidably coupled to the rail 38 and is hung below said rail 38. The second trolley 47 is indirectly connected, as explained hereinbelow, to a second screw nut 48 which in turn is mounted on the second worm screw 35.

A second actuator 49 is hung below the second trolley 47. The second actuator 49 is hinged to the second trolley 47 around a respective oscillating axis which coincides with the oscillating axis "P-P" of the first actuator 41.

Figure 4:
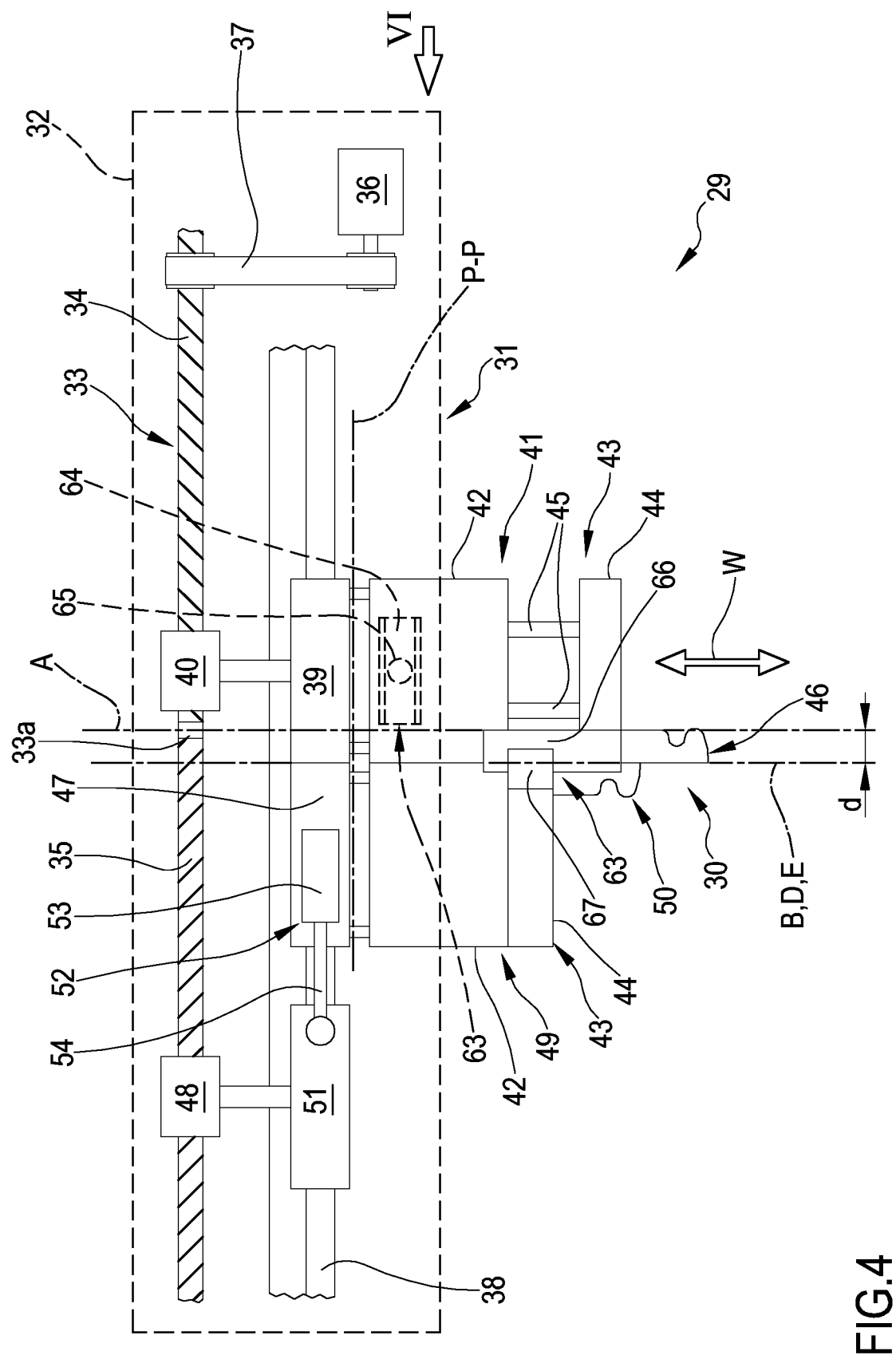
FIG. 4 shows a side elevation view of a cutting group of the apparatus of FIGS. 1 and 2 with some parts hidden in order to better illustrate other parts.

The second actuator 49 is structurally similar to the first actuator 41 and for this reason the reference numbers of the analogous elements are the same. In particular, the second actuator 49 is of pneumatic type and comprises a main body 42 hung from the respective second trolley 47 and pivoted around the abovementioned oscillating axis "P-P". The main body 42 carries a movable part 43 having a plate 44 and a pair of stems 45 (not visible in FIG. 4 since they are retracted) integral with the plate 44 and slidably inserted in a lower zone of the main body 42. The movable part 43 is arranged below the main body 42 and the plate 44 is hung beneath the stems 45. Inside the main body 42, the second actuator 49 comprises pneumatic movement elements (pistons, chambers, pneumatic connections, etc.), not shown. The stems 45 are oriented along the abovementioned vertical lowering/lifting direction "W". The movable part 43 is movable between a first position, in which it lies adjacent to the main body 42 with the stems 45 retracted, and a second position, in which it lies spaced from the main body 42 with the stems 45 extracted (FIG. 4). The plate 44 carries beneath it a second half-part 50 of the knife 30, which is vertically extended downward starting from said plate 44.

The first and the second actuator 41, 49 can be independently driven in order to independently move each of the half-parts 46, 50 of the knife 30 between the first lifted position and the second lowered position.

The first half-part 46 and the second half-part 50 are hung and oscillating around the oscillating axis "P-P" parallel to the cutting direction "T". The first and the second actuator 41, 49 with the respective half-parts 46, 50 are free to oscillate in an independent manner.

An auxiliary trolley 51 is slidably associated with the rail 38, side-by-side the second trolley 47 and connected to said second trolley 47 by means of the interposition of an elastic device 52 constituted by a pneumatic cylinder that defines a pneumatic spring. The second screw nut 48 is directly and rigidly connected to the auxiliary trolley 51.

In the illustrated embodiment, a main body 53 of the pneumatic cylinder 52 is constrained to the second trolley 47 and a stem 54 of the pneumatic cylinder 52 is constrained to the auxiliary trolley 51. The stem 54 is movable and oriented parallel to the rail 38. In a rest configuration, in which the pneumatic cylinder 52 is not subjected to external forces, the stem 54 is maintained in an extracted position by the air contained therein. The pneumatic cylinder 52 is therefore configured for pushing the second trolley 47 away from the auxiliary trolley 51 along the cutting direction "T".

The integral rotation of the first and of the second worm screw 34, 35 actuated by the motor 36 allows moving the first trolley 39, the auxiliary trolley 51 and the second trolley 47 along the rail 38.

Since the first and the second worm screw 34, 35 have opposite thread senses, the rotation of the shaft 33 in a first sense causes the translation of the first screw nut 40 together with the first trolley 39 and of the second screw nut 48 together with the auxiliary trolley 51 towards the central joint 33*a*, i.e. in a mutual moving-close movement. The auxiliary trolley 51 also pushes, through the pneumatic cylinder 52, the second trolley 47 towards the central joint 33*a*. The elastic characteristics of the pneumatic cylinder 52 are such that the thrust exerted by the auxiliary trolley 51 on the second trolley 47 does not cause substantial distance variations between said auxiliary trolley 51 and second trolley 47 (i.e. the stem 54 is not thrust in the respective main body 53) until the second trolley 47 encounters impediments. The first trolley 39 and the second trolley 47 are mutually moved close to each other. The movement devices 31 are therefore configured for moving the first and the second half-part 46, 50 of the knife 30 symmetrically and closer to each other along the cutting direction "T".

The first screw nut 40 and the second screw nut 48 are also mounted on the respective first and second worm screw 34, 35 in a manner such that the first and the second trolley 39, 47 come into mutual contact at a plane of symmetry "A" of the shaft 33 orthogonal to the cutting direction "T" and passing through the centre "H" of the conveyor 18, i.e. through the central joint 33*a*.

If the shaft 33 continues to rotate in said first sense, the first trolley 39 and the auxiliary trolley 51 continue to be moved towards each other and towards the central joint 33*a*. Instead, the second trolley 47 reverses its travel sense since it is thrust by the first trolley 39 towards the auxiliary trolley 51 against the elastic force of the pneumatic cylinder 52. The stem 54 is driven into the respective main body 53 since the elastic characteristics of the pneumatic cylinder 52 are unable to oppose the force exerted by the motor 36. The second trolley 47 is moved together with the first trolley 39 towards the auxiliary trolley 51. The movement devices 31 are therefore configured for moving the first and the second half-part 46, 50 jointly as a single knife along the cutting direction "T".

Stop elements, not illustrated and/or the programming of the motor 36 define a first end stop position of the first trolley 39, in which the first screw nut 40 is close to the central joint 33*a* and a coupling plane "B" between the first trolley 39 and the second trolley 47 is offset with respect to the aforesaid symmetry plane "A" of the shaft 33 (as in FIG. 4). Such coupling plane "B" is offset towards the second worm screw 35 a distance "d" measured with respect to the symmetry plane "A". Such distance "d" is for example equal to about 20 mm.

The rotation of the shaft 33 in a second sense, opposite the first, causes the translation of the first screw nut 40 together with the first trolley 39 and of the second screw nut 48 together with the auxiliary trolley 51 away from the central joint 33*a*, i.e. in a mutual moving-apart movement.

While the stem 54 is not yet completely extracted, the pneumatic cylinder 52 pushes the second trolley 47 against the first trolley 39 and maintains it against said first trolley 39. The first and the second trolley 39, 47 are therefore moved together until the coupling plane "B" reaches the symmetry plane "A" of the shaft 33. In this position, the stem 54 is completely extracted and the pneumatic cylinder 52 is no longer capable of pushing. When subjected to traction, the pneumatic cylinder 52 behaves like a rigid body. It follows that, if the rotation of the shaft 33 continues in the same second sense, the auxiliary trolley 51 drives the second trolley 47 therewith, with its own motion, by means of the completely extended pneumatic cylinder 52, and moves the second trolley 47 away from the first trolley 39. The movement devices 31 are configured for moving said half-parts 46, 50 symmetrically and away from each other along the cutting direction "T".

When the first and the second trolley 39, 47 are together on the coupling plane "B" and the movable parts 43 of both the first and the second actuator 41, 49 are in the same vertical position (both in the first position or both in the second position), the two half-parts 46, 50 of the knife 30 are adjacent to each other at the same coupling plane "B" to form a single body.

Figure 7:
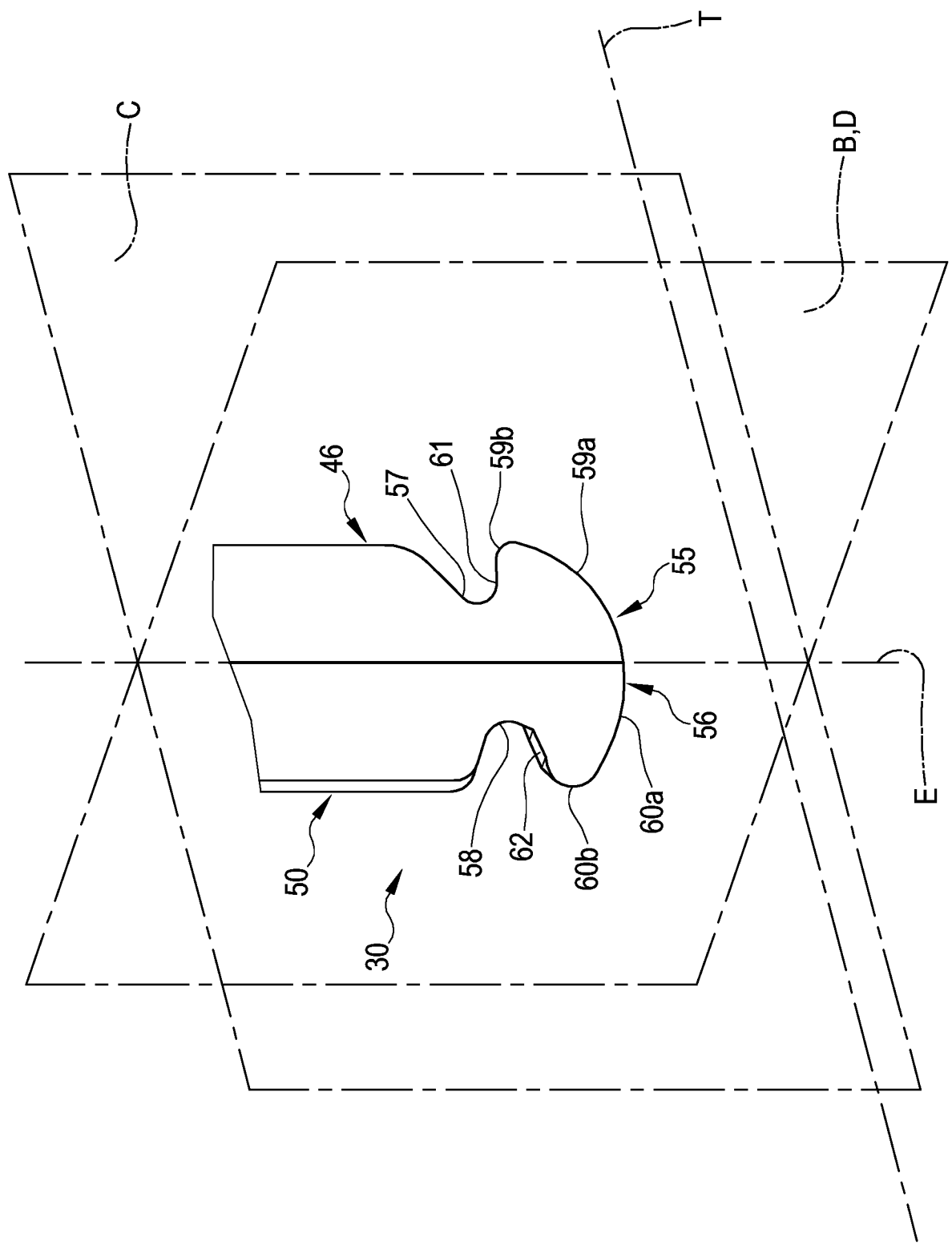
FIG. 7 is an enlarged perspective view of a knife belonging to the cutting group of FIGS. 4, 5 and 6.

In such configuration, the knife 30 in its entirety, with the two half-parts 46, 50 adjacent, has a flattened "butterfly" shape (FIG. 7).

The knife 30 in its entirety has a continuous lower and curved cutting edge (with a semilunar shape) and two lateral cutting edges 57, 58. The lower cutting edge is directed towards the conveyor 18 and the two lateral cutting edges 57, 58 are directed on opposite sides of the knife 30. The lower cutting edge and the two lateral cutting edges 57, 58 lie in a same lying plane "C" which contains the cutting direction "T". The lower cutting edge is formed by the adjacent arrangement of a sabre-like half-cutting edge 55 belonging to the first half-part 46 and a sabre-like half-cutting edge 56 belonging to the second half-part 50.

The first and the second half-part 46, 50 are symmetrical with respect to the coupling plane "B" which therefore constitutes a plane of symmetry "D" of the knife 30 orthogonal to the lying plane "C".

The knife 30 in its entirety has a vertical central axis "E", place of intersection of the symmetry plane "D" and of the lying plane "C" of the knife 30.

More in detail, each first and second half-part 46, 50 comprises the abovementioned sabre-like half-cutting edge 55, 56 defined by a lower curved portion 59a, 60a which is directed towards the conveyor 18, is extended away from the central axis "E" and terminates with a respective tip 59b, 60b. The tips 59b, 60b are oriented on opposite sides of the knife 30. Each lower curved portion 59a, 60a has a radius of curvature of about 50 mm. Each tip 59b, 60b has a radius of curvature of about 2 mm.

Each of the lateral cutting edges 57, 58 is obtained in a recess defined on a lateral edge of the respective half-part 46, 50 opposite the lateral edge situated at the central axis "E". Each lateral cutting edge 57, 58 is placed above the respective sabre-like half-cutting edge 55, 56 and is directed in the cutting direction "T". Each lateral cutting edge 57, 58 has a radius of curvature of about 1 mm.

Each first and second half-part 46, 50 also comprises a support edge 61, 62 directed upward and positioned between the tip 59b, 60b of the respective sabre-like half-cutting edge 55, 56 and the respective lateral cutting edge 57, 58. Each support edge 61, 62 is also obtained in the respective recess of the abovementioned lateral edge and does not have any cutting edge.

The abovementioned movement devices 31 of the knife 30 are configured for moving the knife 30 between the below-described configurations.

A first configuration A in which the first and the second half-part 46, 50 are side-by-side and mutually joined on the abovementioned symmetry plane "D" of the knife 30 and both lie in a lifted position with respect to the conveyor 18 and substantially centred with respect to said conveyor 18 or better yet the symmetry plane "D" of the knife 30 is offset with respect to the symmetry plane "A" of the shaft 33 by the abovementioned distance "d". In other words, the symmetry plane "D" of the knife 30 lies shifted with respect to the centre "H" of the conveyor 18 (intersection between the cutting direction "T" and the middle line "Mt").

A second configuration B in which the first half-part 46 is lowered towards the conveyor 18 while the second half-part 50 remains lifted and also the first half-part 46 and the second half-part 50 lie in a position that is centred with respect to the centre "H" of the conveyor 18. The plane of symmetry "D" of the knife 30 coincides with the plane of symmetry "A" of the shaft 33 (the abovementioned distance "d" is zero). In the movement between the first and the second configuration, the first half-part 46 is lowered, sliding along the central axis "E" and, subsequently, the first and the second half-part 46, 50 are translated together along the cutting direction "T". A third configuration C in which the first half-part 46 and the second half-part 50 are still side-by-side and mutually joined on said symmetry plane "D" and both lie in a lowered position towards the conveyor 18 and centred with respect to the centre "H" of the conveyor 18.

A fourth configuration D in which the first half-part 46 and the second half-part 50 are spaced from each other along said cutting direction "T" and lie in the lowered position and at opposite edges of the conveyor 18.

A fifth configuration E in which the first half-part 46 and the second half-part 47 are spaced from each other along said cutting direction "T" and lie in the lifted position and at the opposite edges of the conveyor 18.

The cutting group 29 also comprises devices 63 for blocking oscillation that are operatively active when the first and the second half-part 46, 50 lie in the substantially centred position with respect to the conveyor 18.

Such blocking devices 63 comprise (FIGS. 4, 5 and 6) a guide 64, defined for example by a C-shaped section, which is extended parallel to the rail 38 and is fixed to the support frame 32. The guide 64 is arranged at the symmetry plane "A" of the shaft 33. The blocking devices 63 also comprise an anti-oscillation wheel 65 rotatably constrained to the main body 42 of the first actuator 41. A rotation pin of the anti-oscillation wheel 65 is perpendicular to the oscillating axis "P-P" and is parallel to the upper abutment surface 22 of the conveyor 18. The extension of the guide 64 is such that the anti-oscillation wheel 65 is inserted in said guide 64 only when the first trolley 39 together with the first actuator 41 approaches the symmetry plane "A" of the shaft 33, i.e. its central zone.

When the anti-oscillation wheel 65 is engaged in the guide 64, the first trolley 39 can still slide along the rail 38 but the oscillation of the first actuator 41 around the oscillating axis "P-P" is blocked, together with the oscillation of the first half-part 46 of the knife 30.

In addition, the position of the guide 64 can be vertically adjusted for centring the first half-part 46 when it is situated at said central zone of the shaft 33.

The blocking devices 63 also comprise a projection 66 integral with the first actuator 41 or with the second actuator 49 and insertable in a seat 67 of the second actuator 49 or of the first actuator 41 when the first and the second half-part 46, 50 are side-by-side and mutually joined. In the illustrated embodiment, the projection 66 is a prism mounted on the plate 44 of the first actuator 41. The prism 66 is vertically extended. The seat 67 is delimited by a C-shaped body mounted on the plate 44 of the second actuator 41 and facing the prism 66. When the prism 66 is inserted in the seat 67, said prism 66 is free to slide in the seat 67 along the vertical lowering/lifting direction "W". Each of the half-parts 46, 50 of the knife 30 is in this way free to be moved between the first lifted position and the second lowered position. The C-shaped body and the second actuator 49 therewith cannot however be laterally moved, along a lateral oscillating direction "S" (FIG. 6) orthogonal to the lying plane "C" of the knife 30 and to the cutting direction "T", with respect to the first actuator 41. Also the second half-part 50 of the knife 30 is therefore prevented from oscillating.

During use and in accordance with the process for building tyres for vehicle wheels according to the present invention, the rubber-covered belt 15, unwound from the reel, is advanced on the conveyor 18 along the supply direction "F" coinciding with the longitudinal extension direction of said rubber-covered belt 15 until it surpasses, by a predefined length, the cutting zone of said conveyor itself 18, i.e. the slit 24. Such predefined length is the correct length for winding the piece (that will be cut) on the forming drum 14 placed downstream and corresponds, for example with the circumferential extension of said forming drum 14.

Figure 8:
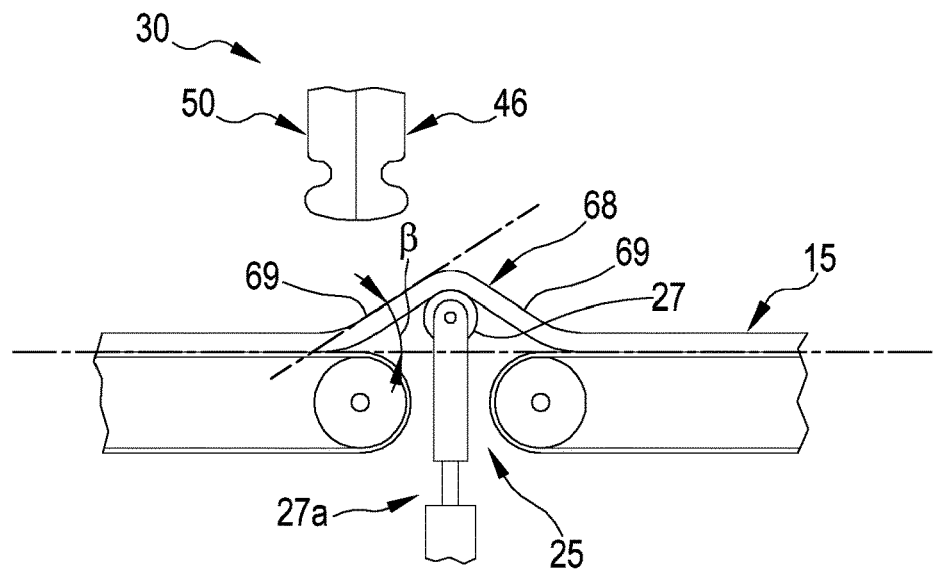
FIG. 8 is a side elevation schematic view of the enlarged portion of FIG. 2 in a respective operative configuration.

At this point, with the rubber-covered belt 15 stopped, the lifting element 25, which was retracted in the slit 24, is carried into the second lifted position and lifts a portion of the rubber-covered belt 15 therewith so as to form a bump 68 placed below the cutting device 17. The bump 68 has two tilted portions 69, each of which forming, with a horizontal plane, a tilt angle "β" of about 40° (FIG. 8).

Figure 9:
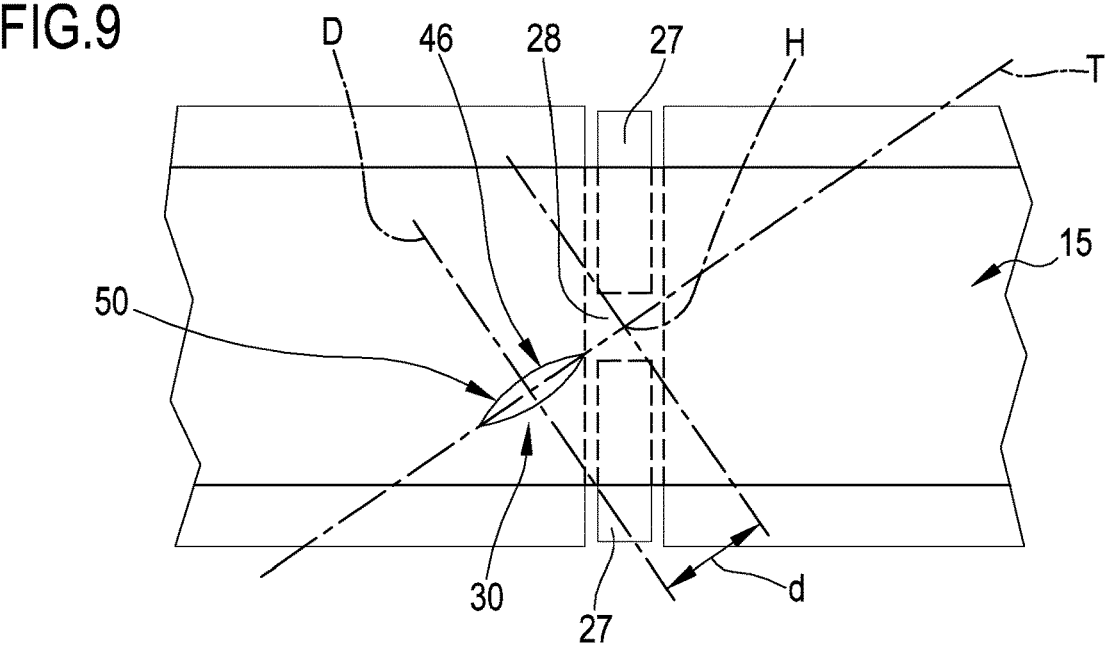
FIG. 9 is a top schematic view of the enlarged portion of FIG. 8.

At said bump 68, the lower part of the rubber-covered belt 15 rests on the rollers 27 except at the passage 28. The knife 30 is situated in the first above-described configuration A. in which said knife 30 is lifted and the symmetry plane "D" of the knife 30 lies shifted, with respect to the centre "H" of the conveyor 18, by the abovementioned distance "d" (FIG. 9).

Figure 11:
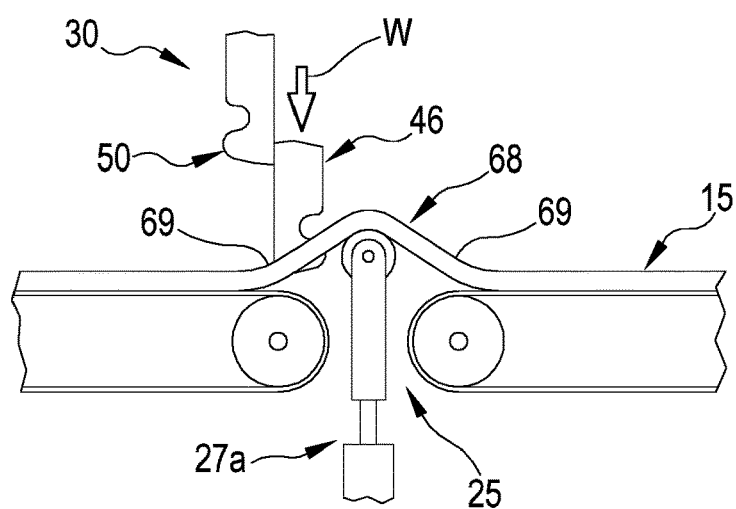
FIG. 11 is the view of FIG. 8 in a further operative configuration.
Figure 10:
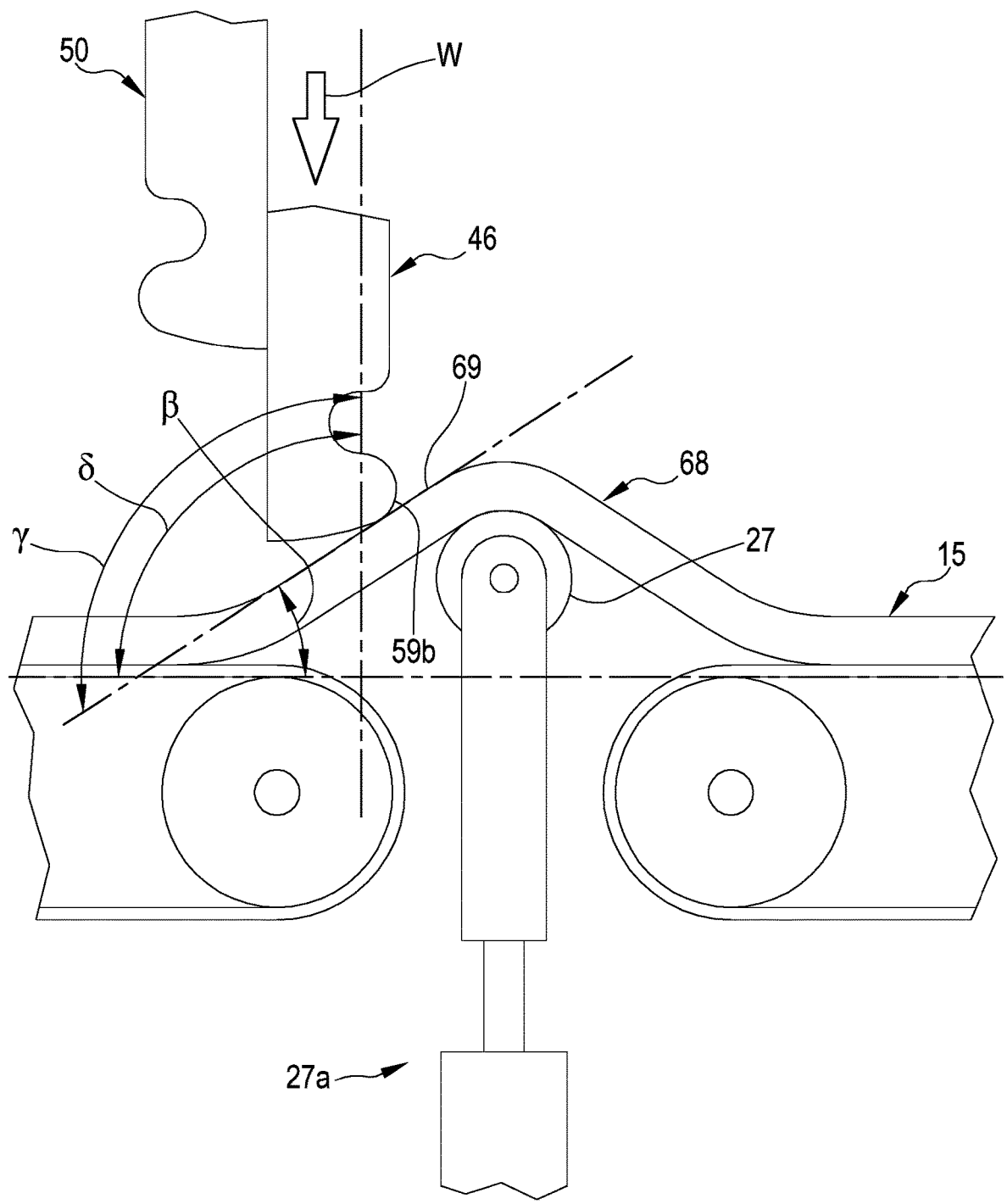
FIG. 10 is the view of FIG. 8 in a different operative configuration.
Figure 12:
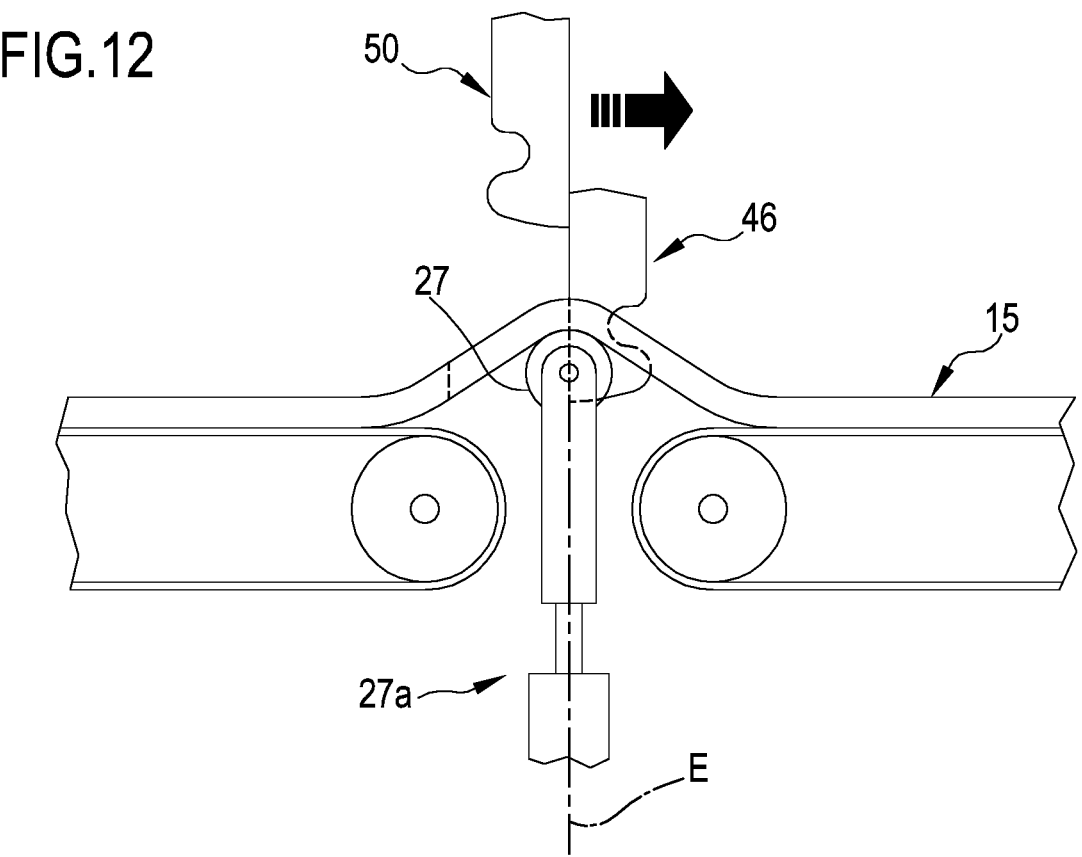
FIG. 12 is the view of FIG. 8 in a further operative configuration.
Figure 13:
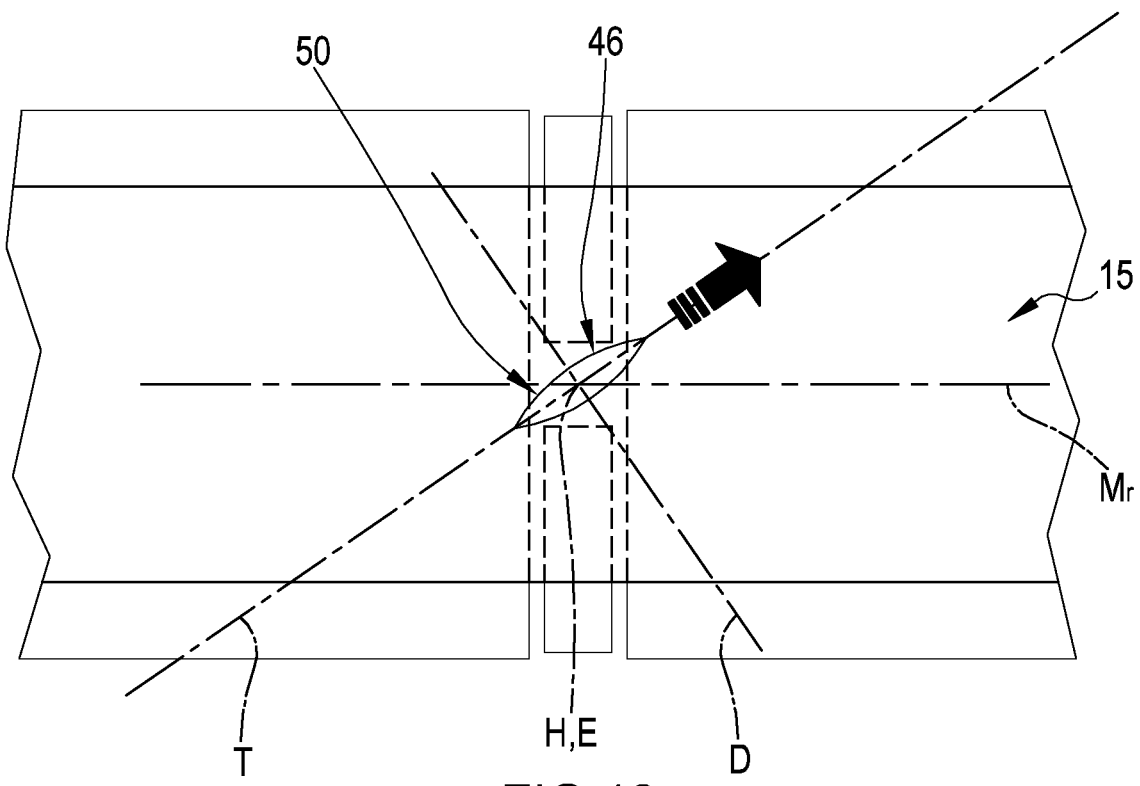
FIG. 13 is a top schematic view of the enlarged portion of FIG. 12.

At this point, the single first half-part 46 is lowered, making it slide with respect to the second half-part 50 along the rectilinear and vertical lowering direction "W". The first half-part 46 punctures the rubber-covered belt 15 on the tilted portion 69 of said bump 68, it cuts it and it is inserted in said rubber-covered belt 15 arranged in the passage 28 of the lifting element 25. Due to the tilt, the first half-part 46 penetrates into the rubber-covered belt 15 at the respective tip 59b and at the respective lower curved portion 59a. More in detail (FIG. 10), the first half-part 46 has a trajectory tilted by an incidence angle "δ", formed with a horizontal plane, preferably equal to 90°. It follows that said first half-part 46 comes into contact with the tilted portion 69 of the bump 68 with an entrance angle "y" (delimited between the direction of said first half-part and the surface of the tilted portion) equal to "δ"+"β", i.e. equal to about 130°. The shape of the sabre-like half-cutting edge 55 allows preventing the cutting of the cords 10, and it allows being inserted between two adjacent cords 10. The first half-part 46 penetrates into the rubber-covered belt 15, generating an opening until the rubber-covered belt 15 itself is carried to the respective lateral cutting edge 57 (FIG. 11). The symmetry plane "D" of the knife 30 is still offset, with respect to the centre "H" of the conveyor 18, the abovementioned distance "d". With the first half-part 46 lowered and the second half-part 50 lifted, said first half-part 46 and second half-part 50 are translated together along the rectilinear and horizontal cutting direction "T" until the symmetry plane "D" of the knife 30 is brought onto the centre "H" of the conveyor 18, i.e. until the abovementioned distance "d" is eliminated (FIGS. 12 and 13). In such position (above-described second configuration B), the central axis "E" of the knife 30, which lies between the first half-part 46 and the second half-part 50, intersects the middle line "Mr" of the rubber-covered belt 15. During this movement, the rubber-covered belt 15 is cut by the lateral cutting edge 57 of the first half-part 46 and partially lifted from the support edge 61 of said first half-part 46. The first half-part 46 enlarges the first opening, generating a notch 70. At the end of such movement, when the central axis "E" of the knife 30 is on the centre "H" of the conveyor 18, the second half-part 50 is situated above the notch 70 created in the rubber-covered belt 15 by the first half-part 46, in particular above the opening originally created by the first half-part 46.

Figure 14:
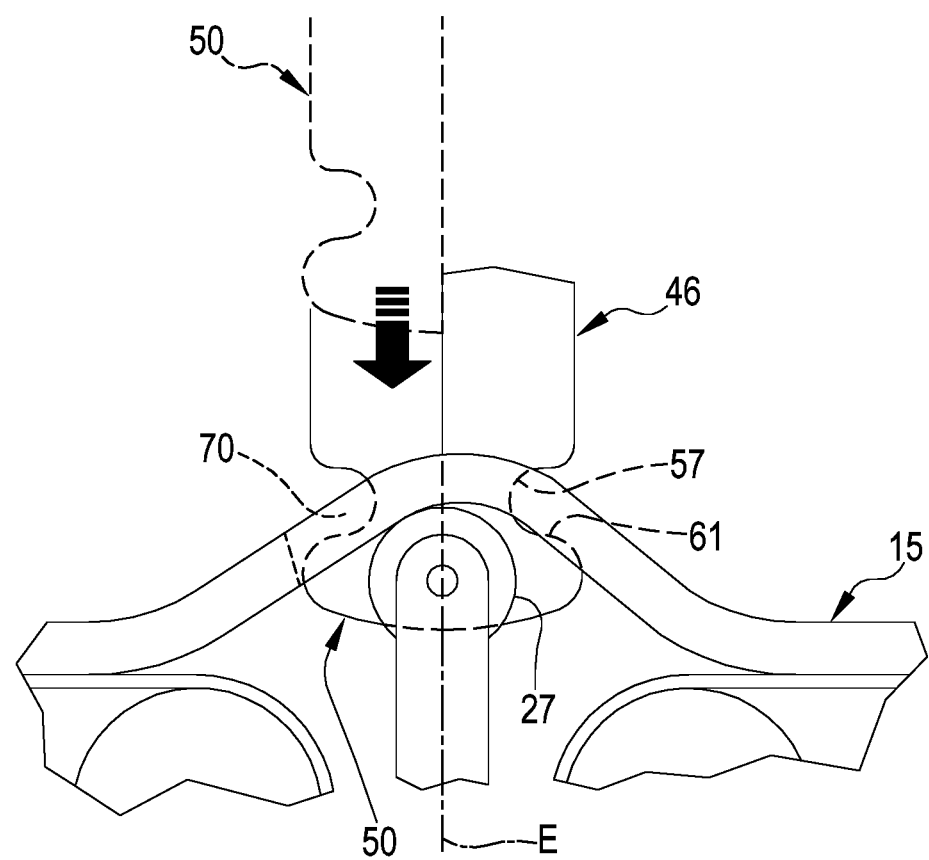
FIG. 14 is the view of FIG. 8 in a further operative configuration.

Subsequently, the second half-part 50 is lowered along the rectilinear and vertical lowering direction "W" so as to once again flank the first half-part 46 (FIG. 14). The second half-part 50 therefore penetrates into the notch 70 without encountering resistance. The knife 30 is situated in the above-described configuration C. and it is situated in the passage 28. After the second half-part 50 has been lowered, the knife 30 formed by the two joined half-parts 46, 50 is once again complete and is situated exactly at the centre "H" of the conveyor 18 and of the rubber-covered belt 15. During the lowering both of the first half-part 46 and of the second half-part 50, oscillation is prevented.

Figure 15:
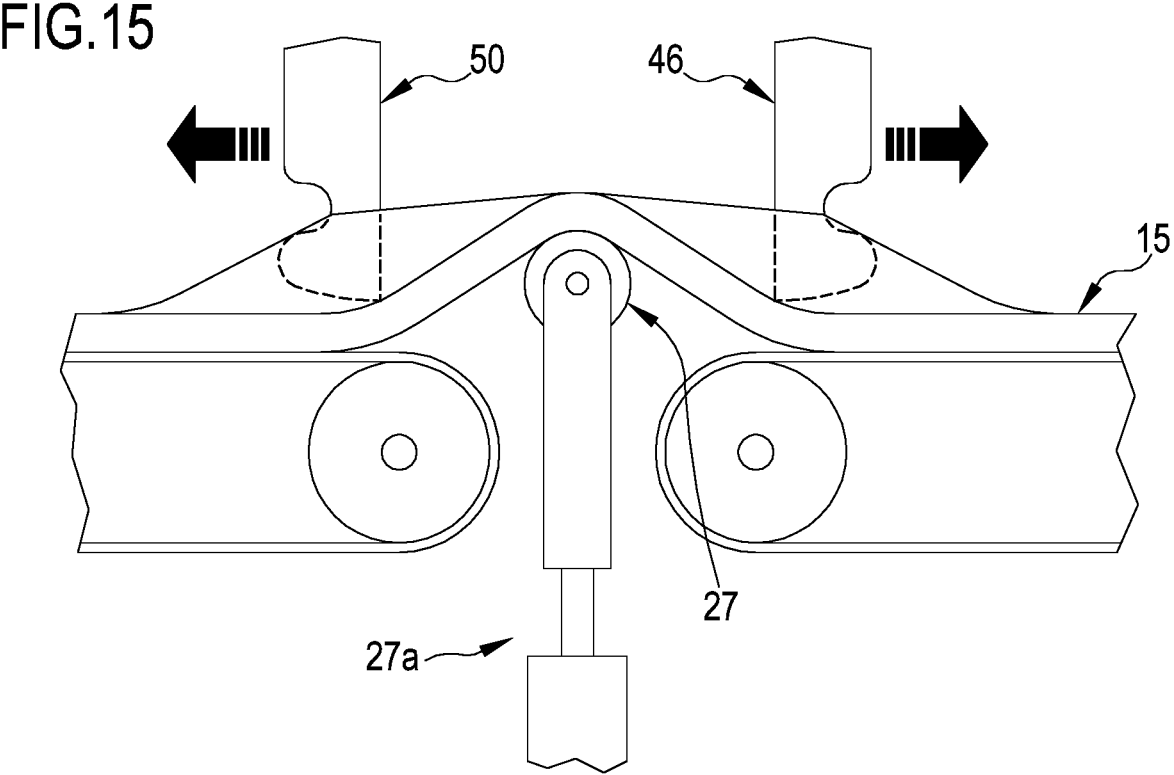
FIG. 15 is the view of FIG. 8 in a further operative configuration.
Figure 16:
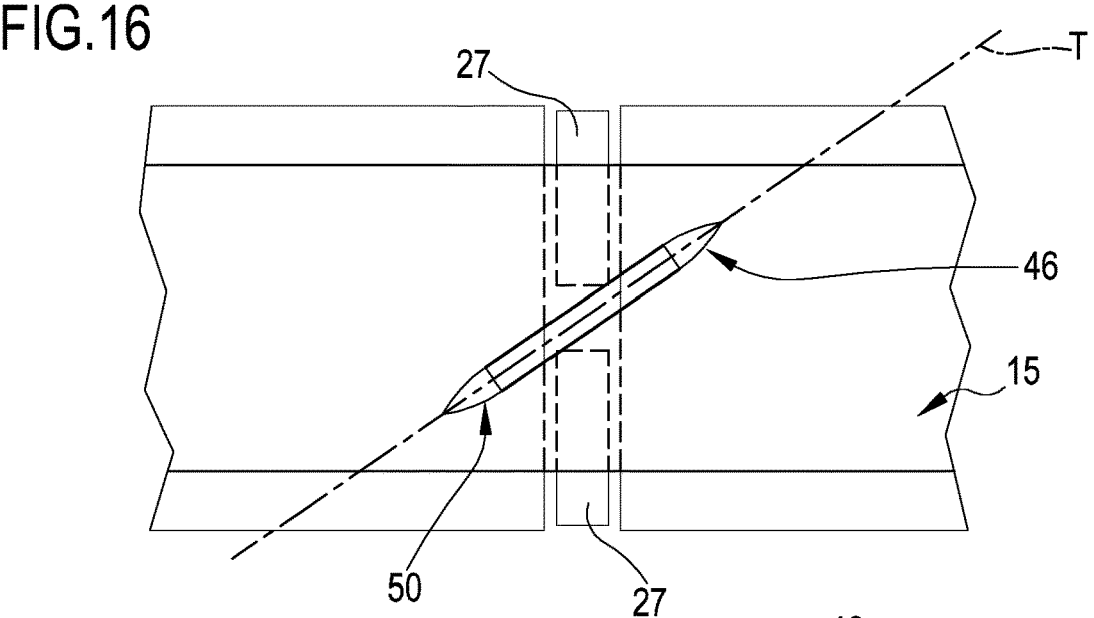
FIG. 16 is a top schematic view of the enlarged portion of FIG. 15.
Figure 17:
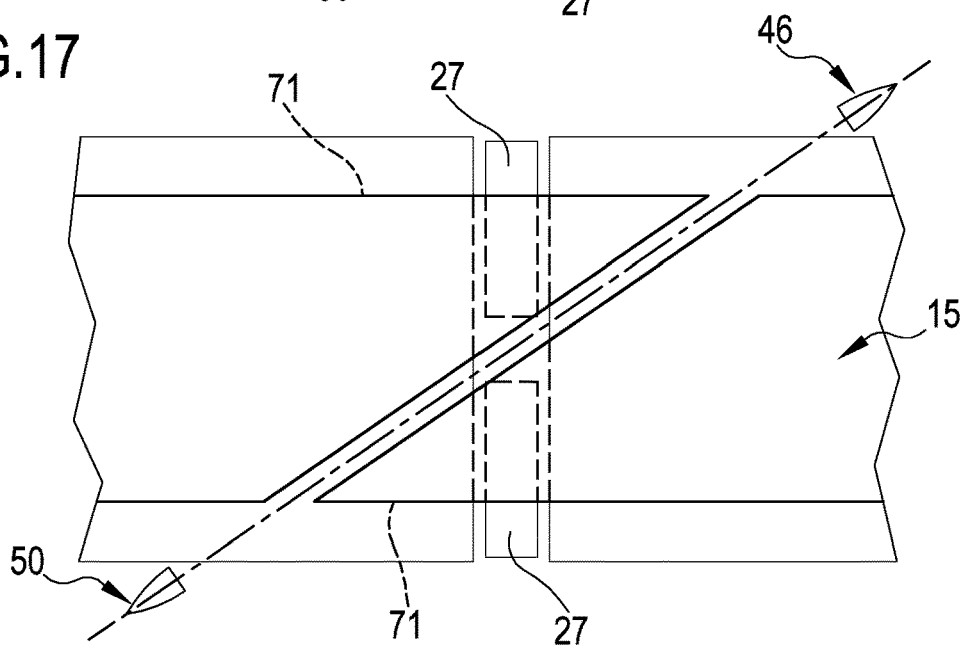
FIG. 17 is the view of FIG. 8 in a further operative configuration.

While the first and the second half-part 46, 50 remain in the lowered position, they are simultaneously and symmetrically moved away from each other along the cutting direction "T" (one in one sense and the other in the opposite sense, FIGS. 15 and 16) until they are brought into the fourth configuration D. (FIG. 17). In other words, the first and the second half-part 46, 50 are synchronously moved away from each other, i.e. at every instant they both have the same velocity (in absolute value). Said velocity can be constant or variable.

During the mutual and symmetric moving-apart of said first and second half-part 46, 50, the rubber-covered belt 15 is supported and partially lifted from the support edges 61, 62 and symmetrically cut by the lateral cutting edges 57, 58. The first and the second half-part 46, 50 continue until they exit from opposite lateral edges 71 of the rubber-covered belt 15 and complete the separation of the piece of the rubber-covered belt 15 placed downstream of the cutting group 17.

During such symmetric moving-apart, the first half-part 46 and the second half-part 50 are free to independently oscillate along the lateral oscillating direction "S" and such oscillation allows the half-parts 46, 50 of the knife 30 to follow the actual cutting angle and to proceed and cut the material between two adjacent cords 10.

Figure 18:
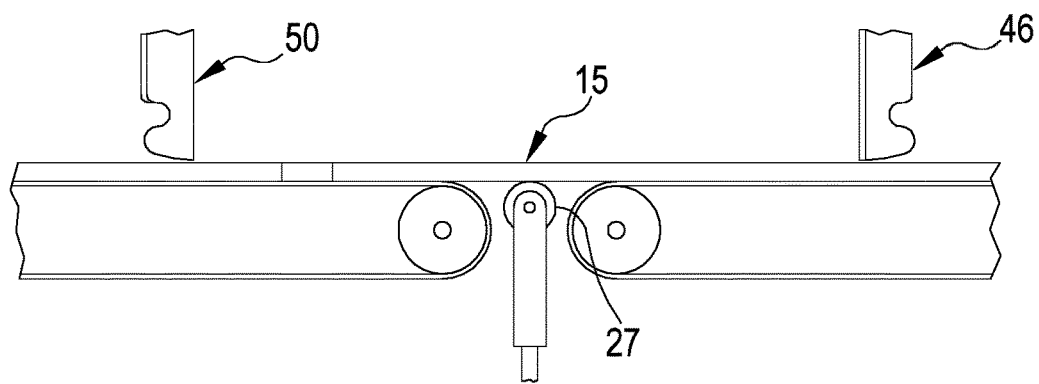
FIG. 18 is a top schematic view of the enlarged portion of FIG. 17.

At the end of the cutting, the first and the second half-part 46, 50 are once again lifted (configuration E, FIG. 18) and then they are moved close to each other again along the cutting direction "T" until they are brought back to configuration A. The knife 30 is then ready to execute a new cutting cycle. The cut piece is then deposited by winding on the forming drum 14.

The invention claimed is:

1. A process for building a tyre for vehicle wheels, comprising:
    forming at least one component of the tyre on a forming drum, wherein said component is formed by:
        supplying a continuous rubber-covered belt;
        cutting to size said continuous rubber-covered belt; and
        laying the continuous rubber-covered belt, cut to size, on the forming drum,
    wherein cutting to size comprises:
        carrying a knife formed by a first half-part and by a second half-part above the continuous rubber-covered belt, in proximity to a central portion of a cutting zone;
        lifting a lifting element placed below the continuous rubber-covered belt and at the cutting zone, until a portion of rubber-covered belt is lifted to form a bump placed at the cutting zone;
        lowering only the first half-part of the knife, making only the first half-part slide with respect to the second half-part, until only the first half-part obtains an opening in said rubber-covered belt, and inserting the first half-part in the aforesaid opening;

jointly moving the first half-part and the second half-part along a cutting direction and in a cutting sense for generating a notch in the rubber-covered belt by the first half-part;

lowering the second half-part, making the second half-part slide with respect to the first half-part until said second half-part is inserted in said notch; and symmetrically moving said first half-part and second half-part synchronously away from each other, in opposite senses and along said cutting direction;

wherein the first half-part is lowered in an offset position with respect to a center of the rubber-covered belt to cut the rubber-covered belt on a tilted portion of the bump; wherein the tilted portion is tilted with respect to a horizontal plane.

2. The process as claimed in claim 1, wherein the first half-part is lowered and subsequently the first half-part and the second half-part are jointly moved.

3. The process as claimed in claim 2, wherein the first half-part is lowered along a rectilinear and vertical lowering direction.

4. The process as claimed in claim 1, wherein the cutting direction is rectilinear and horizontal.

5. The process as claimed in claim 1, wherein, when the second half-part is lowered, a central axis of the knife is substantially placed at a center of the rubber-covered belt.

6. The process as claimed in claim 1, wherein the tilted portion forms, with a horizontal plane, a tilt angle between about 20° and about 45°.

7. The process as claimed in claim 1, wherein the first half-part comprises a sabre-like half-cutting edge and cuts the rubber-covered belt by a tip of said sabre-like half-cutting edge.

8. The process as claimed in claim 7, wherein the first half-part penetrates into the rubber-covered belt at said tip and at a lower curved portion of the sabre-like half-cutting edge adjacent to the tip.

9. The process as claimed in claim 1, wherein the first half-part and the second half-part each comprise a respective lateral cutting edge and wherein, during the symmetrical moving away of said first and second half-part, the rubber-covered belt is cut by said lateral cutting edges.

10. The process as claimed in claim 1, wherein the first half-part and the second half-part each comprise a support edge and wherein, during the symmetrical moving away of said first half-part and second half-part, the rubber-covered belt is supported by said support edges.

11. The process as claimed in claim 1, wherein, during the symmetrical moving away, the first half-part and the second half-part are free to independently oscillate along a lateral direction perpendicular to the cutting direction.

12. The process as claimed in claim 1, wherein, during the lowering, the first half-part and the second half-part are locked to each other and with respect to the rubber-covered belt along a lateral direction perpendicular to the cutting direction.

13. The process as claimed in claim 1, further comprising, after the cutting to size:

lifting said first half-part and second half-part; and moving said first half-part and second half-part close to each other along the cutting direction until the first half-part is rejoined to the second half-part and once again bringing the knife above the central portion of the cutting zone.

14. The process as claimed in claim 13, wherein, after the rejoining, the first half-part pushes the second half-part and said first half-part and second half-part jointly translate until an offset position is reached with respect to a center of the rubber-covered belt.

15. The process as claimed in claim 13, wherein the first half-part is rejoined to the second half-part at the center of the rubber-covered belt.

* * * * *